(12) United States Patent
Hoffmann et al.

(10) Patent No.: US 8,619,908 B2
(45) Date of Patent: Dec. 31, 2013

(54) WIRELESS RANGING SYSTEM AND RELATED METHODS

(75) Inventors: John E. Hoffmann, Indialantic, FL (US); Carlos G. Abascal, Melbourne, FL (US); Christopher D. Moffatt, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 950 days.

(21) Appl. No.: 12/629,584

(22) Filed: Dec. 2, 2009

(65) Prior Publication Data

US 2011/0129023 A1 Jun. 2, 2011

(51) Int. Cl.
*H04L 27/00* (2006.01)
(52) U.S. Cl.
USPC ........... 375/299; 375/260; 375/267; 375/340; 370/203; 370/208; 370/210; 455/101; 455/102; 455/456.1; 455/456.2; 342/107; 342/128; 342/129; 342/133; 342/192; 342/194; 342/196; 342/385; 342/453; 342/457; 342/458; 340/539.13; 702/158; 702/159
(58) Field of Classification Search
CPC ........... G01S 1/02; G01S 1/042; G01S 1/045; G01S 5/0273; G01S 5/0284; G01S 5/06; G01S 5/14; G01S 7/4802; G01S 11/02; G01S 2007/2883; G01S 13/583; G01S 13/584; G01S 13/106; G01S 2007/356; G01S 7/354; H04W 64/00; H04W 64/003; H04L 27/2613; H04L 27/2601; H04L 5/0007; H04L 27/261; H04L 25/0226
USPC ............. 375/260, 267, 299, 240.26; 370/329, 370/203, 208, 210; 455/456.1, 456.2, 455/404.2, 414.2, 101, 102; 342/458, 386, 342/107, 128, 129, 133, 192, 194, 196, 385, 342/453, 457; 340/539.13; 702/158, 159
See application file for complete search history.

(56) References Cited

U.S. PATENT DOCUMENTS

| | | | |
|---|---|---|---|
| 6,950,483 B2 | 9/2005 | Chiodini | H04L 7/00 |
| 7,079,610 B1 | 7/2006 | Johansson et al. | H04B 1/10 |
| 7,616,556 B2 * | 11/2009 | Nystrom et al. | 370/208 |
| 7,800,541 B2 * | 9/2010 | Moshfeghi | 342/465 |
| 7,860,014 B2 * | 12/2010 | Takano | 370/241 |
| 7,983,692 B2 * | 7/2011 | Koike | 455/456.1 |
| 8,081,105 B2 * | 12/2011 | Tigrek et al. | 342/105 |

(Continued)

OTHER PUBLICATIONS

"Optimal Sequences for Channel Estimation Using Discrete Fourier Transform Techniques", by Tellambura et al., IEEE Transactions on Communications, vol. 47, Issue No. 2, pp. 230-238, Feb. 1999.

(Continued)

*Primary Examiner* — Sophia Vlahos
(74) *Attorney, Agent, or Firm* — Allen, Dyer, Doppelt, Milbrath & Gilchrist PA

(57) ABSTRACT

A wireless ranging system for determining a range of a remote wireless device may include a wireless transmitter and a wireless receiver. The wireless ranging system may also include a ranging controller to cooperate with the wireless transmitter and receiver to generate a multi-carrier base waveform, transmit a sounder waveform to the remote wireless device including concatenated copies of the multi-carrier base waveform, and receive a return waveform from the remote wireless device in response to the sounder waveform. The ranging controller may also generate time domain samples from the return waveform, convert the time domain samples into frequency domain data, and process the frequency domain data to determine the range of the remote wireless device.

6 Claims, 28 Drawing Sheets

(56) References Cited

U.S. PATENT DOCUMENTS

| | | | |
|---|---|---|---|
| 2007/0178837 A1* | 8/2007 | Koike | 455/41.2 |
| 2007/0247365 A1* | 10/2007 | Laroia et al. | 342/385 |
| 2008/0070532 A1 | 3/2008 | Moffatt et al. | H04B 17/00 |
| 2008/0273641 A1* | 11/2008 | Yang et al. | 375/359 |
| 2009/0135714 A1* | 5/2009 | Deliwala | 370/210 |
| 2009/0207746 A1* | 8/2009 | Yuan et al. | 370/252 |
| 2009/0237292 A1* | 9/2009 | Tigrek et al. | 342/109 |
| 2009/0251364 A1* | 10/2009 | Lorenz | 342/357.02 |
| 2010/0009644 A1* | 1/2010 | Izumi et al. | 455/132 |
| 2011/0286505 A1* | 11/2011 | Hedley et al. | 375/224 |

OTHER PUBLICATIONS

"Extremal Problem for Polynomials", by Newman, Proc. Amer. Math. Soc., vol. 16, pp. 1287-1290, Dec. 1965.

"On Minimizing the Peak-to-Average Power Ratio for the Sum of N Sinusoids", by Gimlin et al., IEEE Transactions on Communications, vol. 41, No. 4, pp. 631-635, Apr. 1993.

"Interpolation and Decimation of Digital Signals—A Tutorial Review", by Crochiere et al., Proceedings of the IEEE, vol. 69, No. 3, pp. 300-331, Mar. 1981.

"Signal Enhancement—A Composite Property Mapping Algorithm", by Cadzow, IEEE Trans. on Acoustics, Speech, and Signal Processing, vol. ASSP-36, No. 1, pp. 49-62, Jan. 1988.

"Improved Algorithm for Noniterative Time-Domain Model Fitting to Exponentially Damped Magnetic Resonance Signals", by Barkhuijsen et al., Journal of Magnetic Resonance, 73, pp. 553-557 (1987).

"Total Least Squares Based Algorithm for Time-Domain NMR Data Fitting", by Van Huffer, et al., ESAT Laboratory-Katholickle Universiteit Leuven, Kardinaal Mercierlaan 94, 3001 Leuven-Heverlee, Belgium, 1993.

"Estimating the Parameters of Exponentially Damped Sinusoids and Pole-Zero Modeling in Noise", by Kumaresan et al., IEEE Trans. Acoust., Speech, Signal Process., ASSP-30:833-840, 1982.

"Symbol Time Offset Estimation in Coherent OFDM Systems", by Landstrom et al., IEEE Transactions on Communications, vol. 50, No. 4, pp. 545-549, Apr. 2002.

"Low-Complex Frame Synchronization in OFDM Systems", by van de Beek et al., Universal Personal Communications, 1995. Record., 1995 Fourth IEEE International Conference on Nov. 6-10, 1995, pp. 982-986.

"Transmission Techniques for Digital Terrestrial TV Broadcasting", by Sari et al., IEEE Communications Magazine, Feb. 1995, pp. 100-109.

"OFDM Channel Estimation by Singular Value Decomposition", by Edfors et al., IEEE Transactions on Communications, vol. 46, No. 7, pp. 931-939, Jul. 1998.

\* cited by examiner

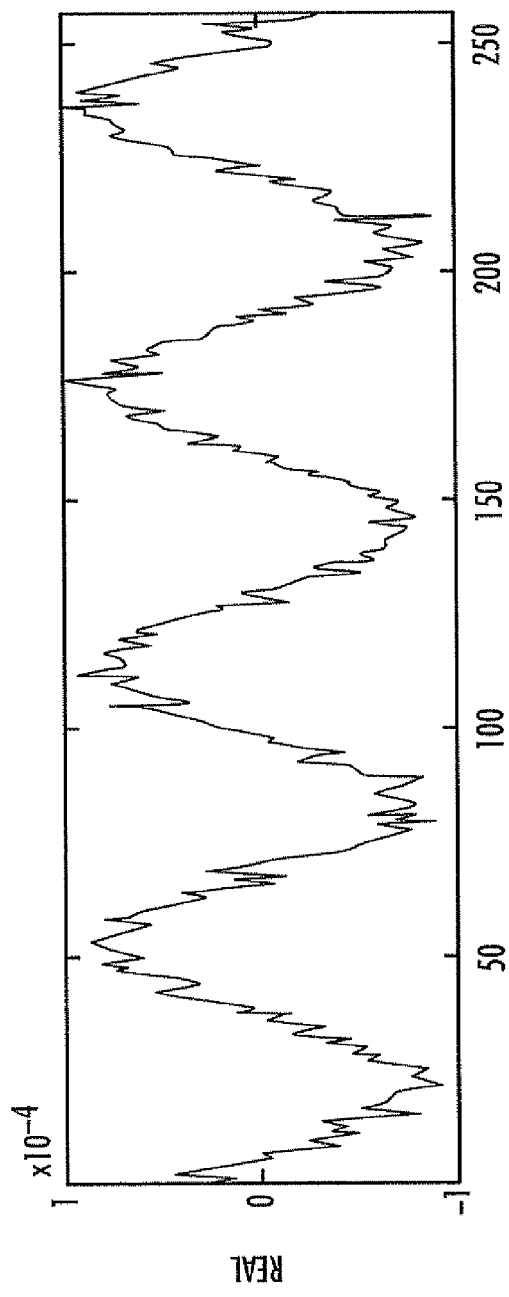
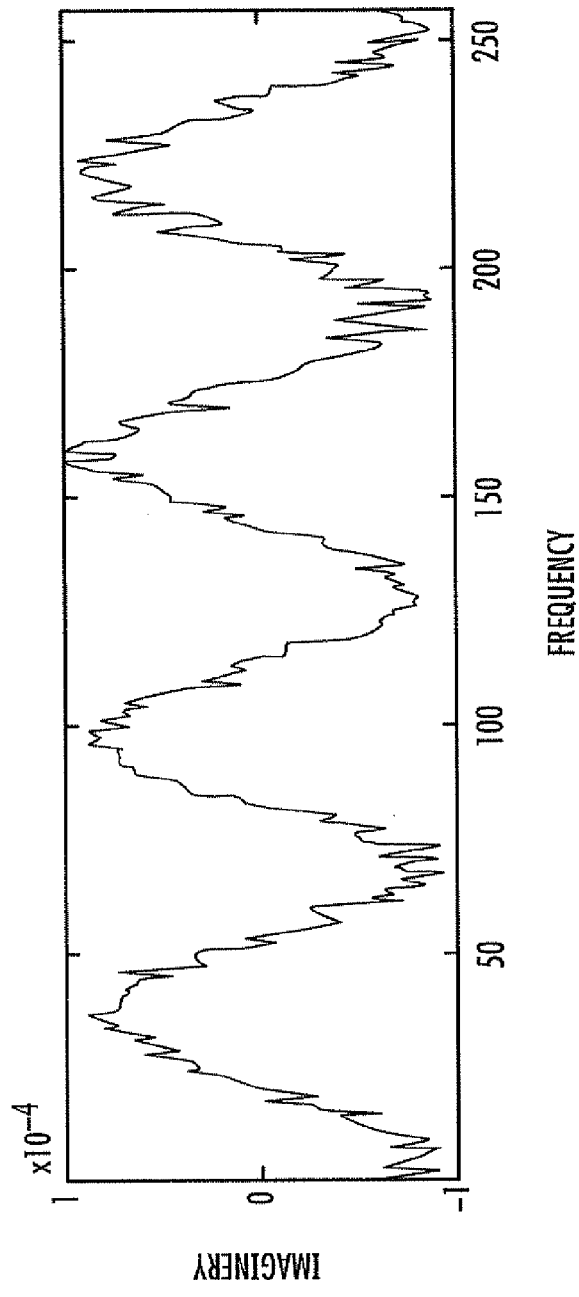
FIG. 8A
FIG. 8B

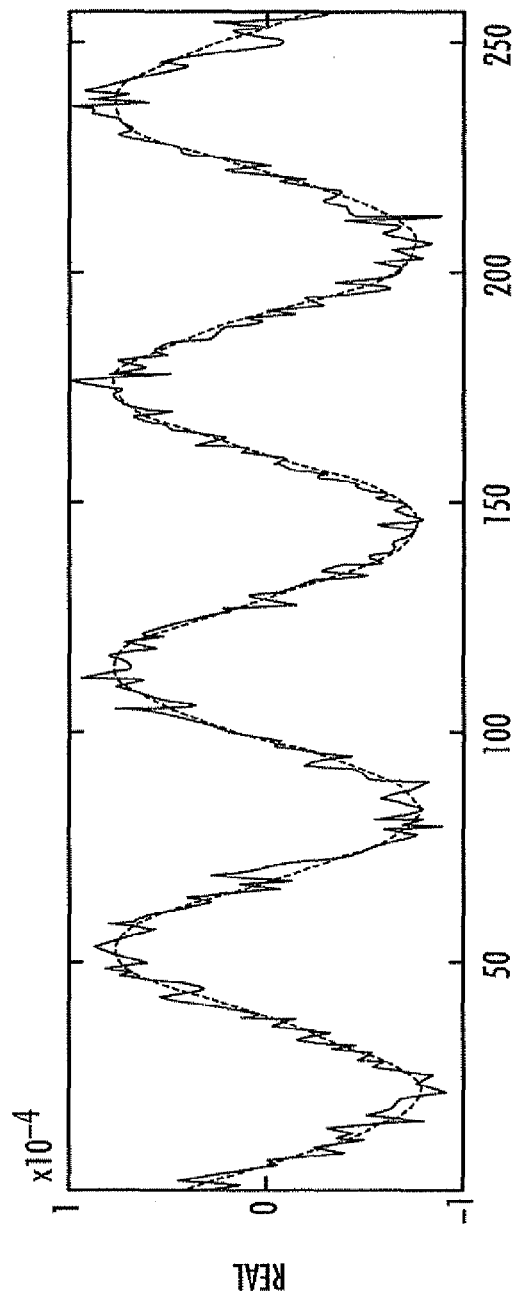
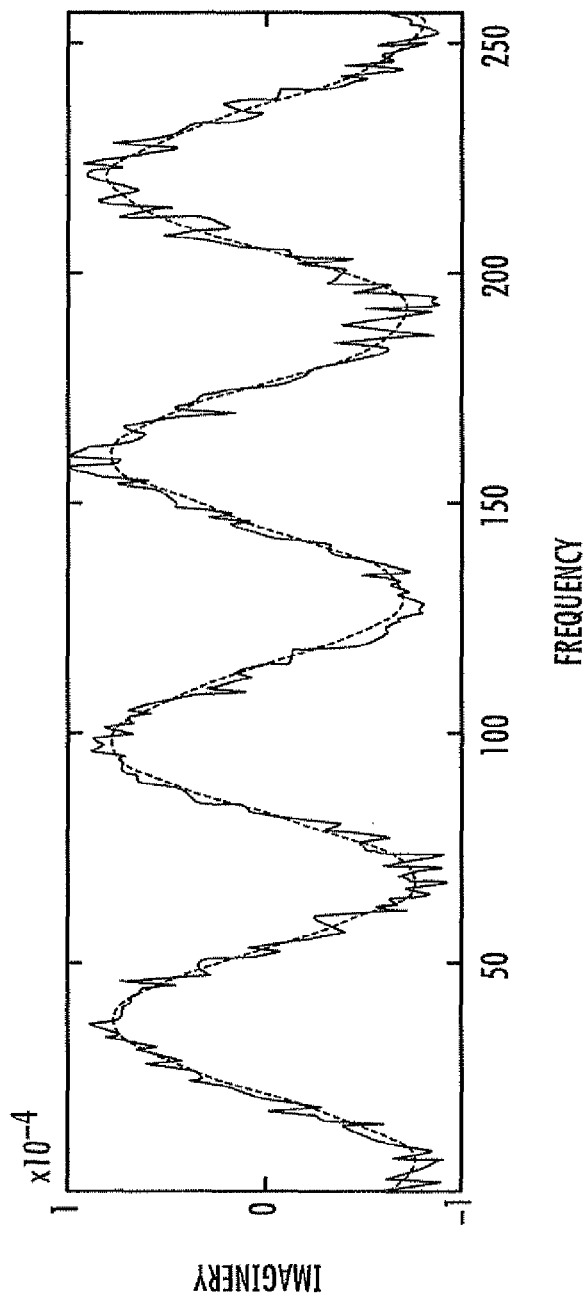
FIG. 9A
FIG. 9B

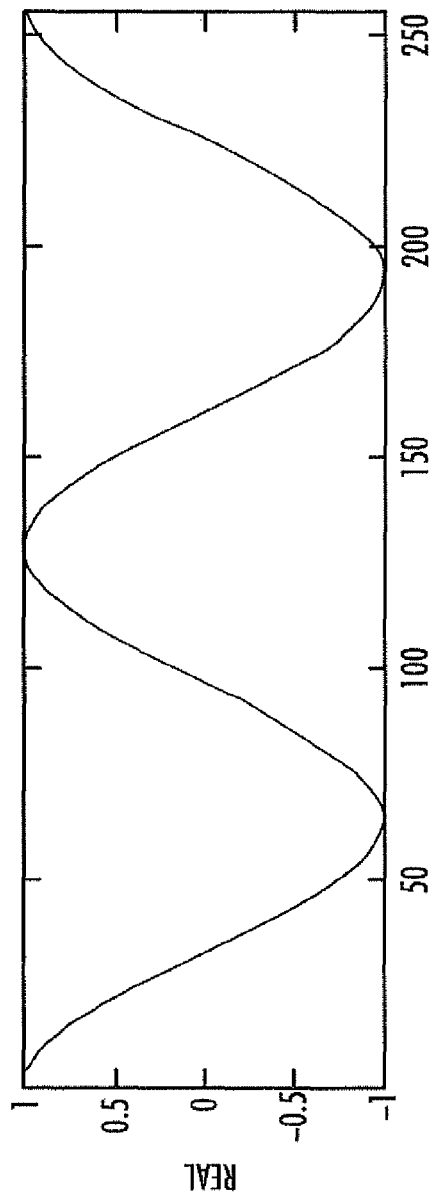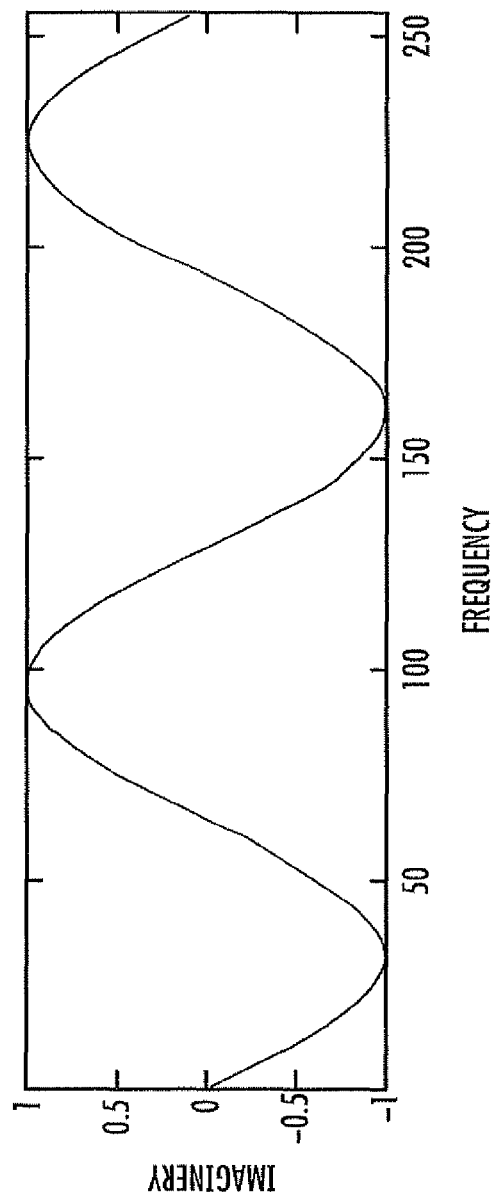
FIG. 11A
FIG. 11B

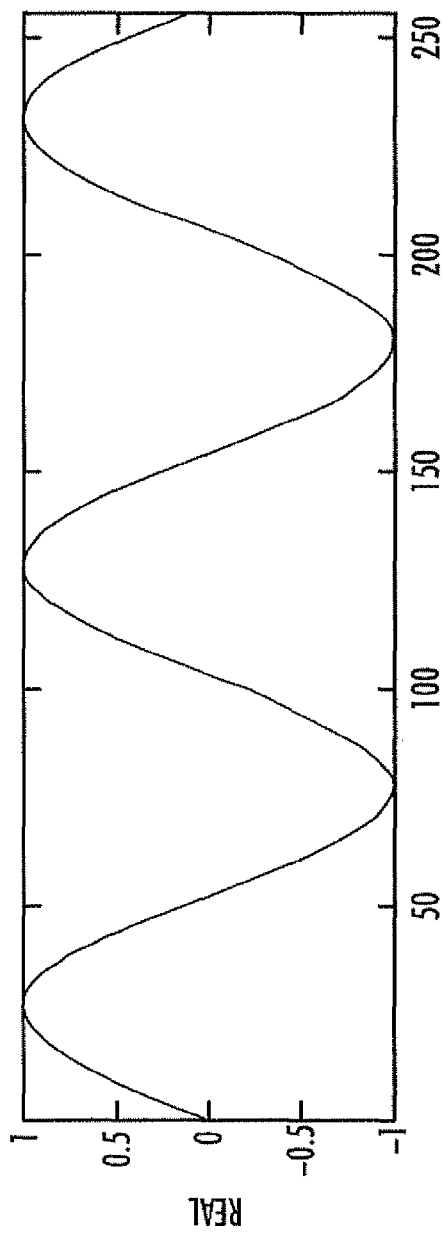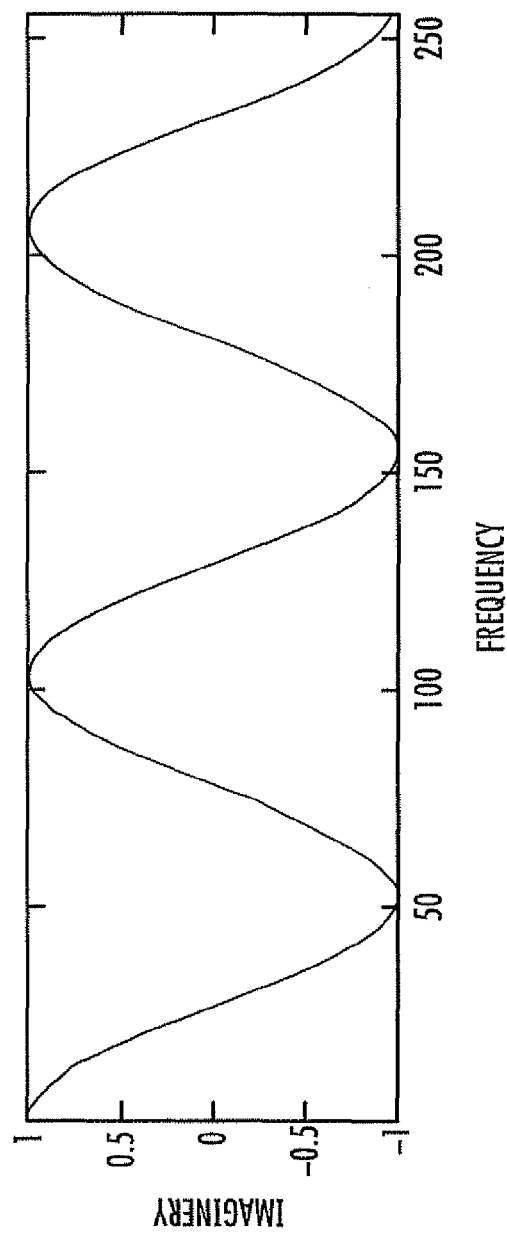

WIRELESS RANGING SYSTEM AND RELATED METHODS

FIELD OF THE INVENTION

The present invention relates to the field of ranging, and, more particularly, to wireless ranging and related methods.

BACKGROUND OF THE INVENTION

It may be useful to determine a location and/or a distance of a remote radio transceiver. More particularly, it may be useful to use the radio transceiver to determine a location of an object or person, such as a firefighter within a building, for example.

A remote radio transceiver may be used in determining the location of the remote object or person. A remote radio transceiver generally receives a transmitted signal from a remote transmitter and processes and transmits a return signal based upon the transmitted signal. For example, a GPS-determined location may be included in the return signal from a typical navigation beacon. The return signal may provide timing information to assist in determining a range to the remote device.

U.S. Patent Application Publication No. 2008/0070532 to Moffatt et al. and assigned to assignee of the present application, Harris Corporation of Melbourne, Fla., and incorporated herein by reference discloses actively determining a range of a remotely located radio receiver, or radio transceiver. The method includes monitoring RF emissions of the RF receiver, generating an RF signal on an RF frequency that can be received by the RF receiver, and detecting a variation in the receiver RF emission or emissions responsive to the RF signal. The variation in the RF emission includes small changes in one or more of the amplitude, phase, or frequency of one or more local oscillator signals, harmonics thereof, or mixing products in the receiver. These changes are caused by the transmitted RF signal. The transmitted RF signal can be used to cause a phase, frequency, amplitude, or combination of phase, frequency, or amplitude modulation of certain signals in the receiver. Such modulation can be caused by various aspects of the receiver design, such as coupling that exists between the local oscillator and other components of the receiver.

Other ranging methods, for example, a ranging algorithm, may be used to compute a distance between two radio transceivers. A basic ranging algorithm may compute correlations in a time domain between a transmitted signal and a received signal. A peak of the correlation may be related to the round trip time delay, which is often specified in samples. If the delay is some fraction of a sample, the peak may be smeared in the correlation. This may be greatly affected by noise and multipath problems, for example. A typical ranging technique may include a curve fit, neighbor weighting, or another technique to attempt to resolve delays.

SUMMARY OF THE INVENTION

In view of the foregoing background, it is therefore an object of the present invention to provide an improved accuracy ranging technique for use with wireless devices.

This and other objects, features, and advantages in accordance with the present invention are provided by a wireless ranging system using a multi-carrier sounder waveform and sub-sampling techniques for determining a range of a remote wireless device. More particularly, the wireless ranging system may include a wireless transmitter and a wireless receiver. The wireless ranging system may also include a ranging controller configured to cooperate with the wireless transmitter and wireless receiver to generate a multi-carrier base waveform.

The ranging controller may also cooperate with the wireless transmitter and wireless receiver to transmit a sounder waveform to the remote wireless device. The sounder waveform may include a plurality of concatenated copies of the multi-carrier base waveform. The ranging controller may receive a return waveform from the remote wireless device in response to the sounder waveform. The ranging controller may further cooperate with the wireless transmitter and wireless receiver to generate time domain samples from the return waveform, convert the time domain samples into frequency domain data, and process the frequency domain data to determine the range of the remote wireless device. Accordingly, the wireless ranging system provides increased ranging resolution.

The ranging controller may generate the time domain samples at a time domain sample rate, and processes the frequency domain data to obtain a higher range resolution than obtainable based upon the time domain sample rate. In other words, ranging controller may process the time domain samples to provide a higher range resolution than would be obtained from the time domain samples alone. The wireless ranging system may further include a common clock operatively coupled to both the wireless transmitter and the wireless receiver, for example. The common clock advantageously reduces the error caused by the transmitter and receiver operating with independent references.

The controller may be configured to generate the multi-carrier base waveform as a multi-carrier orthogonal frequency division multiplexed (OFDM) base waveform, for example. The controller may also process the frequency domain data by at least determining a channel estimate of the return waveform. The channel estimate may be based upon an inversion of the transmitted sounder waveform, for example.

The controller may also process the frequency domain data by at least resolving frequencies in a channel estimate of the frequency domain data and resolve frequencies in the channel estimate based upon a singular value decomposition (SVD), for example. The controller may also process the frequency domain data by at least reducing noise in the channel estimate.

Additionally, the controller may also process the frequency domain data by at least determining a phase lag based upon the return waveform, for example. The phase lag may be determined based upon a quality metric ranking of a correlation of the frequency domain data. Still further, the controller may process the frequency domain data by at least computing a point-by-point multiplication of the frequency domain data by an inverse frequency domain representation of the sounder waveform. The remote wireless device may include a local oscillator generating the return waveform based upon the sounder waveform, for example.

A method aspect may include determining a range of a remote wireless device using a wireless ranging system. The wireless ranging system may include a wireless transmitter, a wireless receiver, and a ranging controller to cooperate with the wireless transmitter and wireless receiver, for example.

The method may include transmitting a sounder waveform to the remote wireless device including a plurality of concatenated copies of the multi-carrier base waveform using the wireless transmitter and the ranging controller, for example. The method may also include receiving a return waveform from the remote wireless device in response to the sounder waveform, and generating time domain samples from the return waveform using the wireless receiver and the ranging controller. The method may further include converting the time domain samples into frequency domain data, and processing the frequency domain data to determine the range of the remote wireless device using the ranging controller, for example.

BRIEF DESCRIPTION OF THE DRAWINGS

FIGS. 8a and 8b are graphs of the respective real and imaginary frequency domain representations of the received return waveform of FIG. 7 with the DC term removed.

FIGS. 9a and 9b are graphs of the respective real and imaginary frequency domain representations of the received return waveform of FIG. 8 with an overlaid noise reduced channel estimate.

FIGS. 11a and 11b are graphs of the respective real and imaginary frequency domain representations of a channel estimate of 2.0 samples of delay in accordance with the present invention.

FIGS. 12a and 12b are graphs of the respective real and imaginary frequency domain representations of a channel estimate of 2.5 samples of delay in accordance with the present invention.

DETAILED DESCRIPTION OF THE PREFERRED EMBODIMENTS

Figure 1:
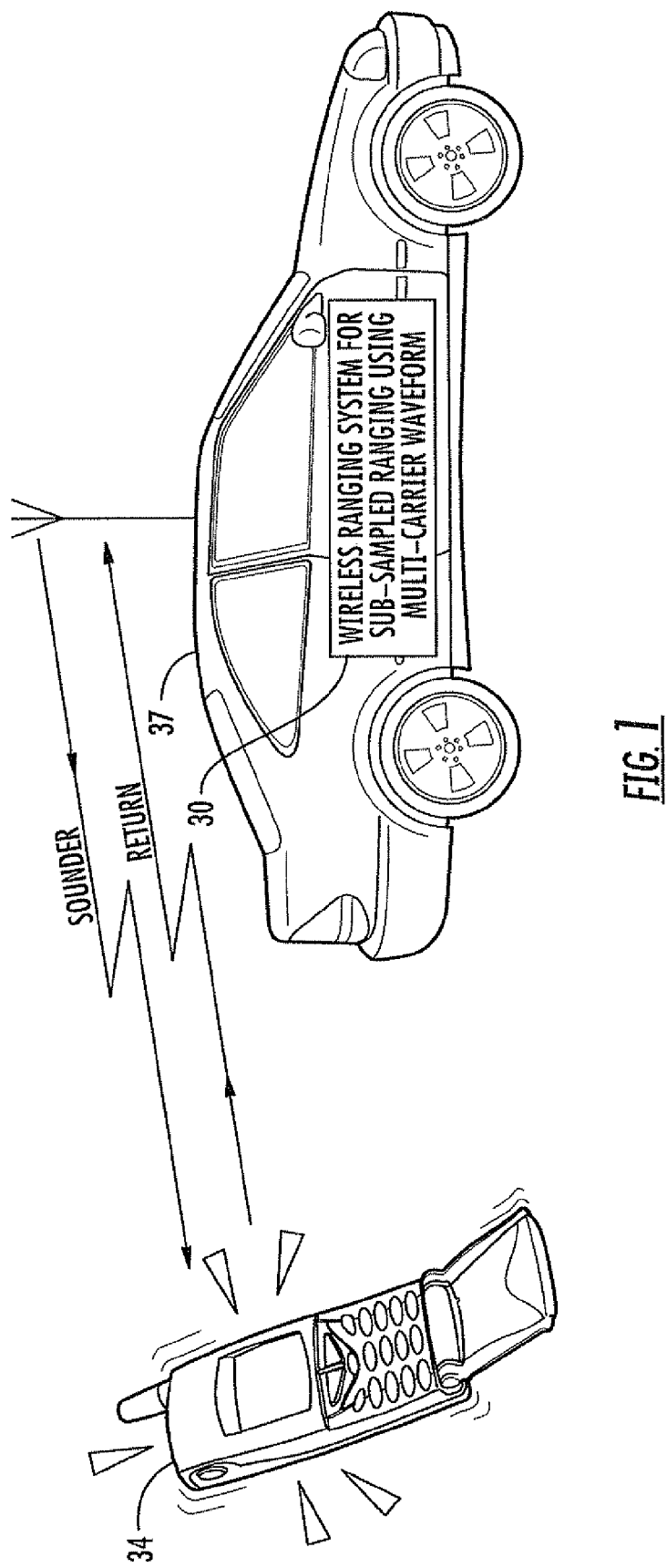
FIG. 1 is a schematic diagram of a wireless ranging system in accordance with the present invention.
Figure 2:
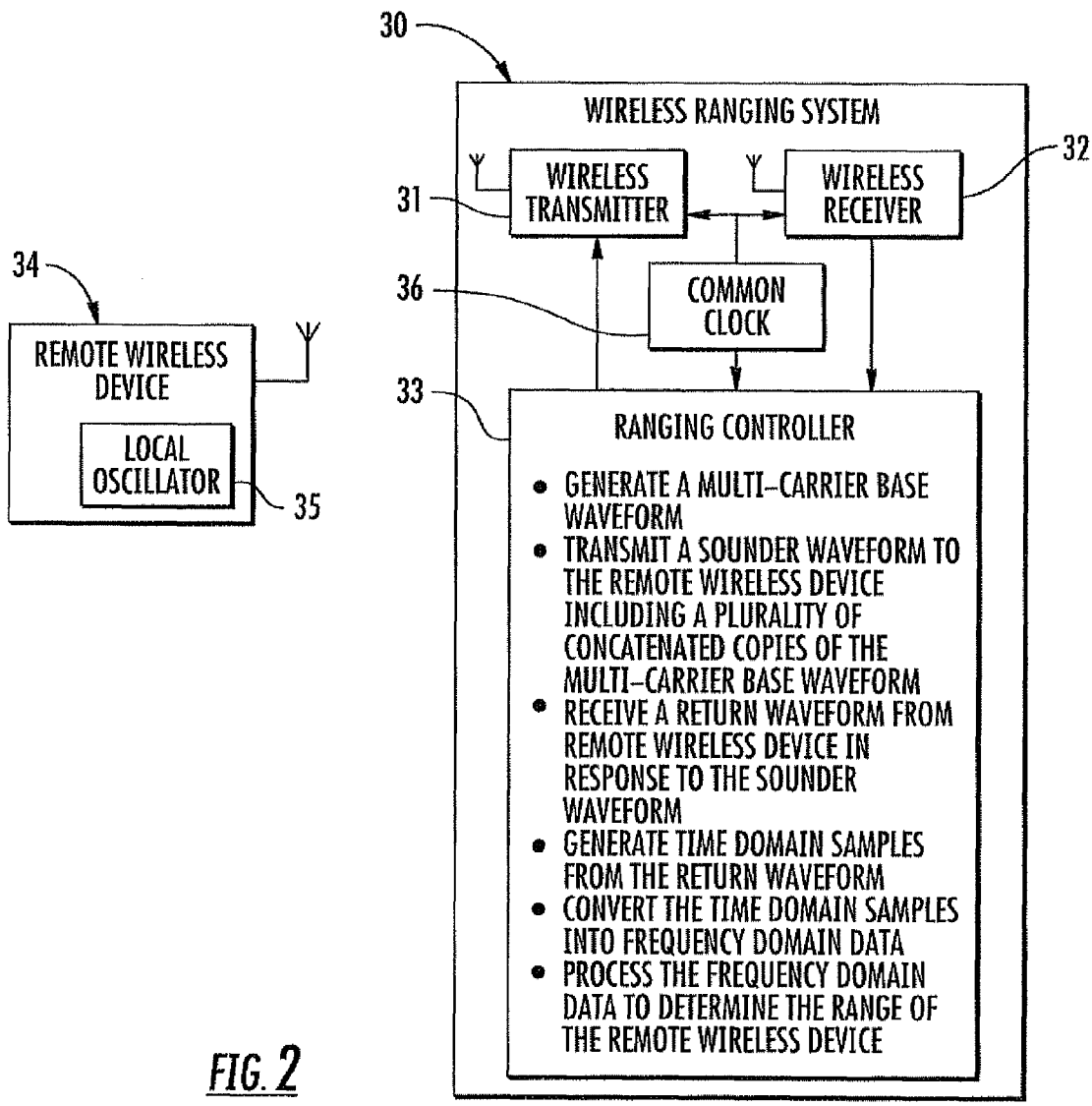
FIG. 2 is a more detailed schematic block diagram of the wireless ranging system of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, the wireless ranging system 30 illustratively includes a wireless transmitter 31 and a wireless receiver 32. The wireless ranging system 30 also includes a ranging controller 33 configured to cooperate with the wireless transmitter 31 and wireless receiver 32 to generate a multi-carrier base waveform. The ranging controller 33 may include a processor (not shown) and a memory (not shown). The ranging controller 33 may also be embodied as configurable modules, as will be appreciated by those skilled in the art.

The ranging controller 33 is also configured to cooperate with the wireless transmitter 31 and wireless receiver 32 to transmit a sounder waveform 41 (FIG. 3) to the remote wireless device 34. The wireless ranging system 30 may be installed on a mobile vehicle 37, as illustrated. The wireless ranging system 30 may also be installed in a stationary location, in an airborne location, or other location, as will be appreciated by those skilled in the art.

The sounder waveform 41 (FIG. 3) includes a plurality of concatenated copies of the multi-carrier base waveform 42a-42d and is transmitted from the wireless transmitter 31 to the remote wireless device 34. The remote wireless device 34 may be, for example, a cell phone, a two-way radio, a pager, or other remote wireless device, as will be appreciated by those skilled in the art. A return waveform is received at the wireless receiver 32 from the remote wireless device 34 in response to the sounder waveform 41. The ranging controller 33 is also configured to cooperate with the wireless receiver 32 to generate time domain samples from the return waveform, convert the time domain samples into frequency domain data, and process the frequency domain data to determine the range of the remote wireless device 34, as will be described in greater detail below.

Figure 3:
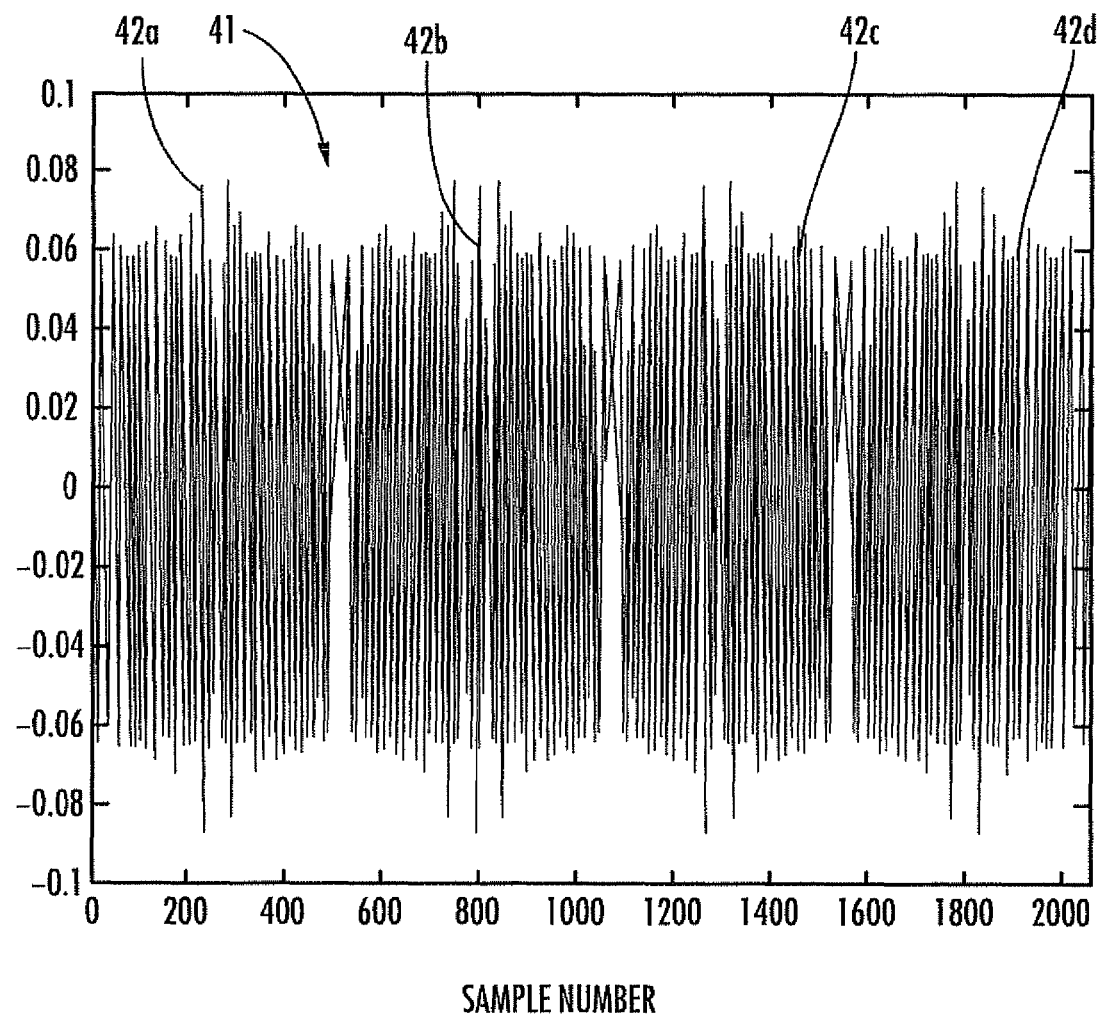
FIG. 3 is a graph of an orthogonal frequency division multiplexed (OFDM) base waveform generated by the wireless ranging system of FIG. 2.
Figure 4:
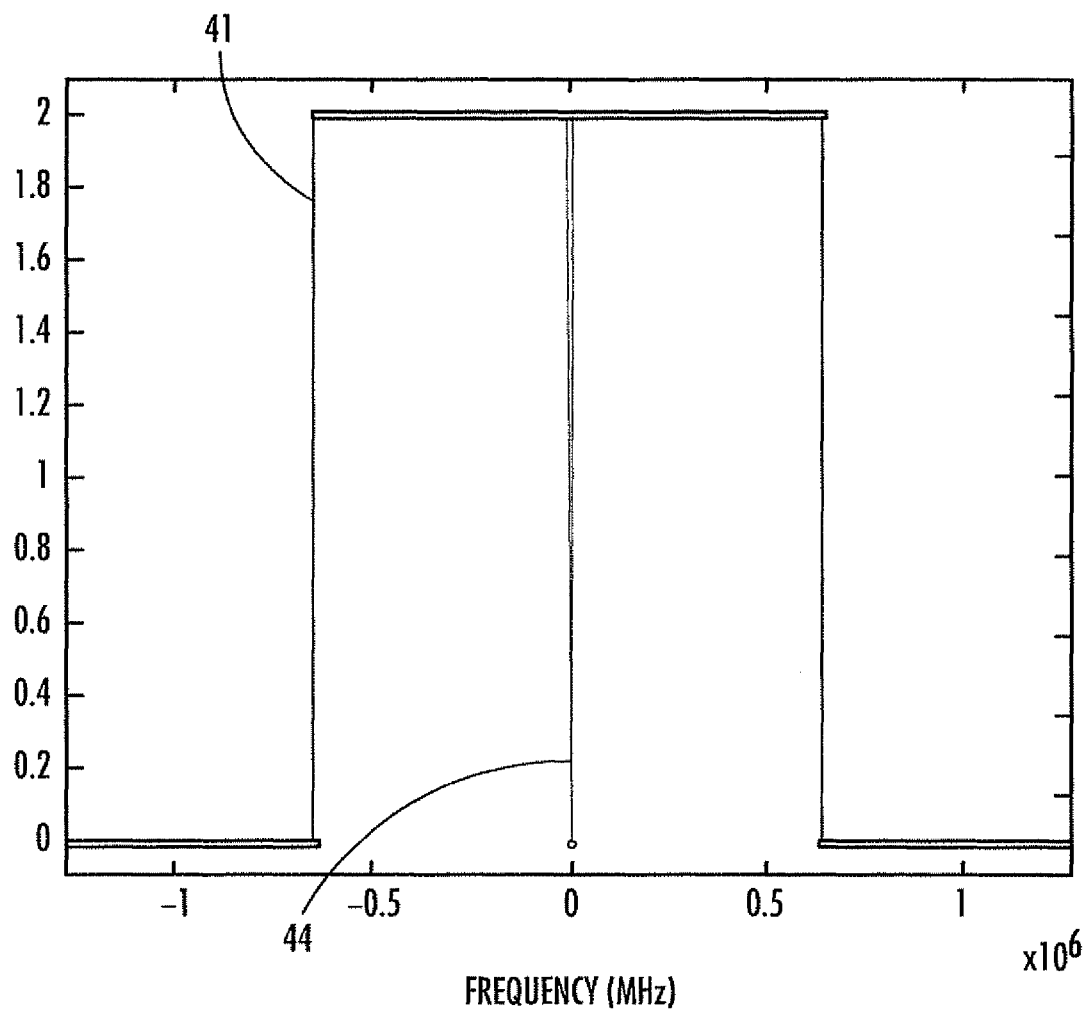
FIG. 4 is a graph of a frequency domain representation of a portion of the OFDM waveform of FIG. 3.

More particularly, a broadband OFDM-like waveform, for example, the sounder waveform 41 as illustrated in FIGS. 3 and 4, is used as an active interrogation signal. A low peak-to-average power ratio (PAPR) implementation with a variable number of equally spaced sub-carriers (tones) may be used. The frequency domain representation must be invertible. A pre-determined number of repeated copies of the base waveform 42a-42d are transmitted back-to-back creating periodic copies with a longer overall duration. Frequency domain processing gain is obtained by taking the fast Fourier transform (FFT) of the longer duration waveform including a plurality of repeated copies of the base multicarrier waveform.

The oversampled frequency domain representation is down sampled at a predetermined sample phase back to the base waveform length. The smaller more manageable set of frequency domain samples are equalized based on the time the sounder waveform 41 was transmitted. The round trip delay of each return path will surface as a sinusoidal frequency component in the channel estimate. Additional noise reduction and singular value decomposition techniques on the channel response may facilitate the sub-sample round trip delay estimation. The above-noted aspects of the wireless ranging system 30 will now be described with further particularity.

The wireless transmitter 31 transmits an orthogonal frequency division multiplexed (OFDM) waveform or signal, as illustrated in FIG. 3, to the remote wireless device 34. The OFDM waveform is used as the active ranging signal for the remote wireless device 34.

One of the main advantages of OFDM is that it is generally not necessary to use a complicated time-domain equalizer to compensate for channel induced fading. Instead of performing this equalization in the time domain, equalization in the frequency domain may be used, for example, as discussed in *Optimal Sequences for Channel Estimation Using Discrete Fourier Transform Techniques* by Tellambura et al., IEEE Transactions on Communications, Volume 47, Issue No. 2, pp. 230-238, February 1999, the entire contents on which are herein incorporated by reference, which results in significantly less processing complexity. The equalization process, which will be discussed later, relies on having knowledge of the inverse frequency domain representation of the transmitted long symbol for each of the sub-carriers.

The addition of N complex exponentials produces a time-domain waveform with a certain peak-to-average power ratio (PAPR). By setting the phase of each complex exponential to a specific angle, it may be possible to produce a waveform with minimum PAPR. For example, *An L1 Extremal Problem For Polynomials* by Newman, Proc. Amer. Math. Soc., Volume 16, pp. 1287-1290, December 1965, the entire contents of which are herein incorporated by reference, discloses that a minimal PAPR of 2.6 dB can be produced by applying quadratic phases to constant amplitude complex exponentials, independent of the number of sub-carriers. This technique is considered distortionless since only phase values of the complex exponential are adjusted, and no clipping, filtering, or compounding of the time-domain waveform is applied.

For example, consider an even number of orthogonal complex exponentials $N_c$ with identical amplitude and equally spaced $\Delta f = 1/T_{sym}$ Hertz apart, where $T_{sym}$ is the symbol duration. The output multicarrier waveform is formed by the summation of the complex exponentials $$x(t) = \sum_{k=0}^{N_c-1} A_k \cdot e^{-j[2\pi(f_k - f_c)t + \phi_k]}$$

Where $f_k$ are the sub-carrier center frequencies $f_k = f_0 : \Delta f : f_{max}$ such that $f_0$ is the fundamental (i.e lowest) sub-carrier frequency, and $f_{max}$ is the highest sub-carrier frequency. The frequency $f_c$ is used to center the complex spectrum about the origin.

$$f_c = \frac{f_{max} + f_0}{2}$$

and $$f_{max} = \Delta f \cdot (N_c - 1) + f_0$$

Note that when using an odd number of symbols $N_{sym}$ and analyzing the spectrum with an FFT, $\pm\frac{1}{2}$ should be added to $f_c$ to allow sub-carriers to fall in integer frequency bin locations to avoid inter-carrier interference (ICI). In general, $F_s > 2 \cdot f_{max}$, $T_s = 1/F_s$, $T_{sym} = 1/\Delta f$, $N = N_{sym} \cdot (F_s \cdot T_{sym})$ and $t - 0:T_s: T_s \cdot N - T_s$ where $N_{sym}$ is the number of symbols to generate. The maximum PAPR that occurs when all $N_c$ sub-carriers are added in phase is $$PAPR_{max} = 10 \log(N_c) \text{ (dB)}$$

As shown in, On Minimizing the Peak-to-Average Power Ratio for the Sum of N Sinusoids by Gimlin et al., IEEE Transactions on Communications, Volume 41, No. 4, pp. 631-635, April 1993, the entire contents of which are herein incorporated by reference, the ideal phase relationship for producing the minimum PAPR may be obtained by passing the zero-phase complex envelope of the summed complex exponentials through the transfer function $$H(w) = e^{-j\left(\frac{w^2}{4\alpha}\right)}$$

where $$\alpha = \frac{N_c \pi}{T^2}$$

This phase relationship provides $PAPR_{typical} = 2.6$ dB for large $N_c$, independent of the number of sub-carriers and center frequency. This multi-carrier waveform with PAPR=2.6 dB is formed by applying the quadratic phases $$\phi_k = \frac{\omega^2}{4\alpha} = \frac{\pi}{N_c}\left[\frac{(f_k - f_c)}{\Delta f}\right]^2$$

The continuous-time low PAPR waveform is found by substituting the equation for $\phi_k$ into the equation for the summation of the complex exponentials x(t) above.

$$x(t) = \sum_{k=0}^{N_c-1} A_k \cdot e^{-j\left(2\pi(f_k - f_c)t + \frac{\pi}{N_c}\left[\frac{(f_k - f_c)}{\Delta f}\right]^2\right)}$$

The discrete OFDM sounder waveform x(n) can be generated using an inverse discrete Fourier transform (IDFT) by centering the sub-carriers about DC on integer sub-carrier center frequencies and setting $\Delta f = 1$ $$x(n) = \frac{1}{N} \sum_{k=-\frac{N_c}{2}}^{\frac{N_c}{2}-1} A_k \cdot e^{-j\left(\frac{2\pi \cdot k \cdot n}{N} + \frac{\pi}{N} k^2\right)} = \frac{1}{N} \sum_{k=-\frac{N_c}{2}}^{\frac{N_c}{2}-1} \left(A_k \cdot e^{-j\left(\frac{\pi}{N} k^2\right)}\right) e^{-j\left(\frac{2\pi \cdot k \cdot n}{N}\right)}$$

Where N is the IDFT size and n=0:N−1. The low PAPR waveform is now computed efficiently using an inverse fast Fourier transform (IFFT).

$$x(n) = \frac{1}{N} \sum_{k=0}^{N-1} X_k \cdot e^{-j\left(\frac{2\pi \cdot k \cdot n}{N}\right)}$$

Where the complex quadratic sub-carrier values are $X_k = A_m \cdot e^{-j\cdot \phi_m}$ with quadratic phase $$\phi_m = \begin{cases} \frac{\pi}{N_c} \cdot m^2 & \frac{-N_c}{2} \leq m < \frac{N_c}{2} \\ 0 & \text{elsewhere} \end{cases}$$

and amplitude $$A_m = \begin{cases} A & \frac{-N_c}{2} \leq m < \frac{N_c}{2} \\ 0 & \text{elsewhere} \end{cases}$$

The discrete frequency m preorders the IFFT input data (i.e. performs a fast Fourier transform (FFT) shift) and is obtained using the modulo function $$m = \mathrm{mod}\left(k + \frac{N}{2}, N\right) - \frac{N}{2}$$

By applying this quadratic phase relationship, the location where the maximum peak occurs in time becomes deterministic. The maximum PAPR of x(t) occurs at approximately $$t \approx \pm\left(\frac{T}{2}\right) - 1.163 \cdot \frac{T}{\sqrt{2N}}$$

Because of the strong similarity between Fourier analysis and synthesis equations in continuous time, there is a duality between the time domain and frequency domain.

$$X[k] = \sum_{n=0}^{N-1} x[n] W_N^{kn} \quad \text{Analysis Equation}$$

$$x[n] = \sum_{n=0}^{N-1} X[k] W_N^{-kn} \quad \text{Synthesis Equation}$$

where $W_N = e^{-j(2\pi/N)}$, the duality property is summarized as follows.

If $$x[n] \xleftrightarrow{DFS} X[k], \text{ then } X[n] \xleftrightarrow{DFS} Nx[-k]$$

If a periodic sequence x[n] has Fourier coefficients X[k] then x[n−m] is a shifted version of x[n] and $$x[n-m] \xleftrightarrow{DFS} W_N^{km} X[k]$$

Because the sequence of Fourier series coefficients of a periodic sequence is a periodic sequence, a similar result applies to a shift in the Fourier coefficients by an integer 1. Specifically, $$W_N^{-nl} x[n] \xleftrightarrow{DFS} X[k-l]$$

Note the difference in the sign of the exponents in the previous two equations.

Let $x_1[n]$ and $x_2[n]$ be two periodic sequences each with period N and each with discrete Fourier series coefficients denoted by $X_1[k]$ and $X_2[k]$, respectively.

If we form the product, $$X_3[k] = X_1[k] X_2[k],$$

then the periodic sequence $x_3[n]$ with Fourier series coefficients $X_3[k]$ is, $$x_3[n] = \sum_{m=0}^{N-1} x_1[m] x_2[n-m]$$

This result suggests that multiplication of frequency domain functions corresponds to convolution of time domain functions. The last equation looks very much like a convolution sum which involves the summation of the product of $x_1[m]$ and $x_2[n-m]$ which is a time-reverse and time-shifted version of $x_2[m]$. Since both sequences are periodic with period N and the summation is over only one period, the convolution above is referred to as a circular convolution.

Through discrete Fourier analysis, it may be shown that the periodic convolution of periodic sequences corresponds to multiplication of the corresponding sequences of Fourier series coefficients. In summary, $$\sum_{m=0}^{N-1} x_1[m] x_2[n-m] \xleftrightarrow{DFS} X_1[k] X_2[k]$$

This relationship, and some of the previous equations may be used to explain the results when channel equalization is performed on a delayed version of a transmit waveform.

The OFDM sounder waveform 41 has known amplitude and phase values at each of the sub-carrier frequencies. Therefore, the frequency domain representation of the transmitted waveform $X_1[k]$ is known in advance at the wireless receiver 32 and the ranging controller 33. As well, the inverse frequency domain representation of the transmitted waveform $X_1[k]^{-1}$ can be calculated in advance. The ranging controller 33 cooperates with the wireless transmitter 31 to send the time domain version $x_1[n]$ over the air to the device of interest. In a perfect channel, for example, a delayed version of the transmitted waveform may arrive at the wireless receiver 32 such that $y_1[n]=x_1[n-d]$. When channel and device effects are considered, the received waveform is the delayed version of the transmitted waveform $x_1[n]$ convolved with h[n] the channel response (out and back) along with the remote wireless device's 34 frequency response such that $y_1[n]=h[n]*x_1[n-d]$. The estimate of the frequency domain transfer function (output divided by input) is $\hat{H}[k]=Y_1[k]/X_1[n]$. This is a comparison of the waveform that was sent, versus the echo waveform that was received. Replacing the division operation in the previous equation with the calculated inverse frequency domain representation of the transmitted waveform results in $\hat{H}[k]=Y_1[k]\cdot X_1[k]^{-1}$. The periodic convolution property shows that convolution in the time domain is the same as multiplication in the frequency domain. Therefore since $y_1[n]=h[n]*x_1[n-d]$ then $Y_1[k]=H[k]\cdot X_1[k-d]$. The shift of a periodic sequence property shows that $$x[n-m] \xleftrightarrow{DFS} W_N^{km} X[k]$$

so $Y_1[k]=H[k]\cdot W_N^{kd}\cdot X_1[k]$.

Combining these properties, $\hat{H}[k]=H[k]\cdot W_N^{kd}\cdot X_1[k]\cdot X_1[k]^{-1}=H[k]\cdot W_N^{kd}$. The feature to be exploited in this ranging method is based on the fact that the transfer function estimate includes a sinusoid at a frequency related to the delay d in time $W_N^{kd}=e^{-j(2\pi kd/N)}$.

As will be appreciated by those skilled in the art, the time domain sequence is generally the same length as the number of sub-carrier tones selected. To facilitate processing gain at the wireless receiver 32, the ranging controller 33 extends the waveform's time duration by concatenating multiple copies of the same time domain sequence 42a-42d back-to-back. For this waveform, it is phase synchronous at the start and end of the sequence such that the concatenation process does not create unwanted frequency spectrum effects. Inter-segment interference is reduced since each of the repeated waveform segments is identical. The segment replication creates phase continuous boundaries. This also makes linear convolution "appear" as circular convolution over the duration of the useful period, which simplifies equalization at the wireless receiver 32. The consequence of this effective sampling rate increase (interpolation by an integer factor) is the creation of zero values between the original frequency domain representation of the base waveform, as described in *Interpolation and Decimation of Digital Signals—A Tutorial Review* by Crochiere et al., Proceedings of the IEEE, Volume 69, No. 3, pp. 300-331, March 1981, the entire contents of which are herein incorporated by reference.

Again, the duality property of Fourier analysis shows that operations in the time domain have a companion operation in the frequency domain. When a time domain signal is "filled up" with L-1 zero valued samples between each pair of original samples, the spectrum of the new signal includes not only the baseband frequencies of interest, but also images of the baseband signal centered at harmonics of the original sampling frequency. It effectively concatenates L copies of the baseband signal in the frequency domain. Therefore, the duality property indicates that if we concatenate L copies of the baseband signal in the time domain, it creates a frequency domain representation with L-1 zero valued samples between each pair of the original frequency domain values. The amplitude of the nonzero samples will generally be L times larger.

Referring more particularly to FIGS. 3 and 4, the OFDM sounder waveform 41 includes 256 sub-carrier tones and 2048 concatenated copies. It should be noted that FIG. 3 illustrates only four concatenated copies in the time domain and FIG. 4 illustrates only one concatenated copy in the frequency domain. Thus, a Nyquist sampled waveform of length 524,288 samples is generated. Due to bandwidth filtering in the wireless transmitter 31 and wireless receiver 32, the waveform was oversampled by a factor of two to create a time domain sequence of 1,048,576 samples. Therefore, each segment copy is 512 samples in duration. These samples were generated at a rate of 2.56 Msps generating a waveform that occupies 1.28 MHz of bandwidth and lasting 409.6 mS. Other sample generation rates may be used. Note the zero-valued DC term in the frequency domain representation in FIG. 4. The effects of the zero value DC term will be discussed later. Different numbers of sub-carrier tones and concatenated copies may be used, and thus different frequency waveforms may be generated. As will be appreciated by those skilled in the art, the higher the frequency, the higher the resolution of ranging and the wider the bandwidth.

The OFDM sounder waveform 41 is received at the remote wireless device 34. The remote wireless device 34 may include a local oscillator 35 (LO) that operates at a frequency. The remote wireless device 34 receives the transmitted OFDM sounder waveform 41, and emits an RF mixing sum of the OFDM waveform and the LO waveform resulting in a frequency shift. In other embodiments, the remote wireless device 34 may actively transmit the RF mixing sum of the OFDM sounder waveform 41 and the LO waveform resulting in a frequency shift. In either case, the mixed waveform including the transmitted OFDM sounder waveform 41 and LO waveform are received by the wireless receiver 32.

The million point sequence is down sampled at the ranging controller 33 by the oversampling factor (i.e. 2) before taking the FFT of a now half-million point sequence. Since the original waveform before oversampling met the Nyquist criteria, it should still satisfy the sampling rate needed after downsampling. In other embodiments, an FFT of the million point sequence may be performed, and the two ranges $-F_s/4$ down to $-F_s/2$ and $F_s/4$ up to $F_s/2$ may be ignored.

Figure 5:
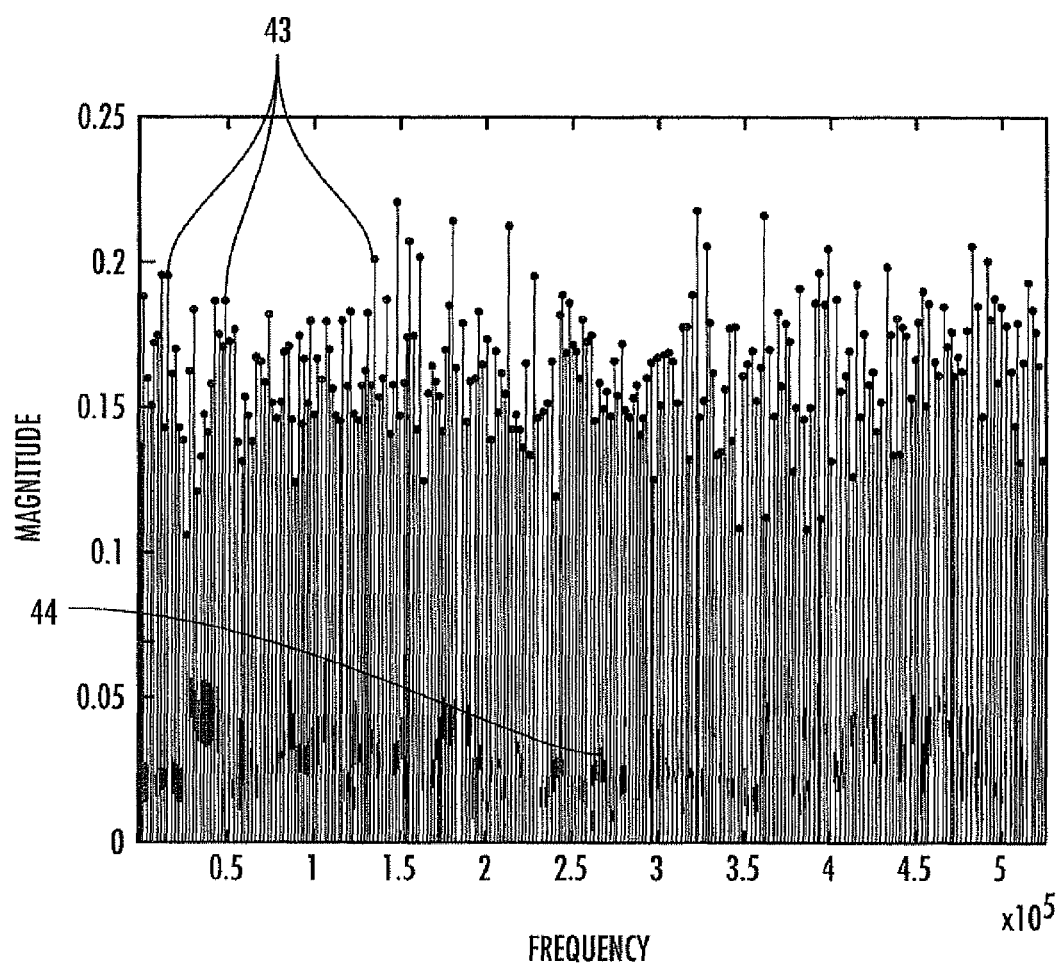
FIG. 5 is a graph of a fast Fourier transform (FFT) representation of the received return waveform from the remote wireless device of FIG. 2.

Referring now additionally to FIG. 5, in one embodiment, taking the FFT at the ranging controller 33 of the half-million point sequence that is sampled at 1.28 Msps, returns a frequency domain representation that resolves to 2.44 Hz per bin (1.28e6 MHz/524,288 samples). There are 256 bins 43 of interest, which are based on the number of tones selected in the base waveform segment before concatenation and the oversampling factor. These 256 bins 43 are channel equalized as previously discussed. For a perfectly frequency locked system, for example, the 256 bins 43 of interest are spaced 2048 bins apart and reside in multiples of 2048 apart from the center sample (262,144) of the FFT, which represents the DC term 44. The FFT response shown in FIG. 5 illustrates the 256 bins 43 at the desired downsample phase highlighted with dots.

As noted above, the waveform received by the wireless receiver 32 is the RF mixing sum of the OFDM sounder waveform 41 and the LO waveform. More particularly, the frequency of the received signal is also shifted by the parts-per-million (ppm) offset of the LO 35. This shift may be as much as a few kilohertz for some remote wireless devices. The consequence of the offset is that the 256 bins of interest are shifted up or down by the "static" offset. For example, if the target has a +700 Hz offset, the bins may be moved to the right by about 287 bins (700 Hz/2.44 Hz/bin). If, for example, all 2048 possible phases of the 524,288 sample frequency domain representation are decimated by 2048, there may be one phase that has the majority of the energy (i.e. the 256 bins of interest). In the +700 Hz offset example, sample decimation phase 287 may include the 256 bins (each originally spaced by 2048) that have the information of interest for channel equalization. Given that the transmit and receive sample rates are locked, synchronized, or driven by the same clock, the frequency offset of the local oscillator 35 can be obtained during the passive mode scanning process that searches for LO frequencies. The main contributor to frequency offset is the ppm offset of the device local oscillator 35, typically due to manufacturing inaccuracies of the reference crystal oscillator.

An additional contribution to frequency offset may be a Doppler shift. The offset can either be compensated for with the digital down converter or with a search of all 2048 possible phases of the frequency domain representation. More particularly, a coarse estimate by the ranging controller 33 of the local oscillator offset bounds the search space to tens of bins to the left and right of the location. For example, if the local oscillator offset is known to be approximately +700 Hz, a search of the samples' phases to the left and right of 287 should be performed instead of testing all 2048 phases.

Depending on the angle of approach toward the remote wireless device 34, Doppler is another "dynamic" contributor to frequency offset. The relationship between observed frequency f' and emitted frequency f is $f' = f \cdot (1+v/c)$ where v is the velocity of the wireless transmitter 31 relative to the wireless receiver 32 in meters per second and c is the speed of an electromagnetic wave traveling in a vacuum also in meters per second. For example, when the wireless ranging system 30 is included in the vehicle 37, as illustrated in FIG. 1, the velocity is a positive number when the vehicle is moving toward the remote wireless device 34 and negative when the vehicle is moving away from the remote wireless device 34. In one example, a vehicle 37 speed of 15 miles per hour (6.7 meters per second) translates to a change in observed frequency of 0.0223 parts per million. For a transmitted frequency of 450 MHz with an upper sideband return around 900 MHz, this equates to about 20 Hz. Given the frequency domain resolution previously discussed, this equates to an offset of 8 bins.

If the angle of approach is not straight on, the Doppler offset reduces as the angle of incidence increases as the vehicle 37 approaches the remote wireless device 34 to its left or right. This shift over time produces a smearing of the frequency content over multiple FFT bins. Depending on the final sample rates and transmit waveform durations, the change in frequency through a burst collection may be negligible and may be determined based upon the sampling plan and waveform properties selected.

The Doppler offset is typically greatest at a 45-degree angle of incidence and at close range to the remote wireless device 34. The greatest Doppler rate of change is when the signal is located broadside to the vehicle 37 motion or wireless receiver 32 motion. The further the vehicle 37 is away from the remote wireless device 34, the less the rate of change. Straight toward the remote wireless device 34 has the largest frequency offset but the rate of change is zero. Parallel to the remote wireless device 34 has the lowest frequency offset, but it too has a rate of change near zero.

The frequency offset lag determination algorithm is based upon 256 carriers of interest and 2048 possible frequency domain lag phases, which corresponds to the number of repeated copies of the time domain sequence. A first approach for determining frequency offset lag determination summed the power in every $2048^{th}$ bin of the FFT. The largest sum was the lag chosen for equalization. This method was biased by system spurs, a dominant DC term, and other unwanted narrowband interferers.

Another approach involves using a quality metric for determining the frequency offset phase lag determination. This approach includes removing the power bias that each bin had on the sum weighting each bin equally, regardless of individual power per bin at the ranging controller 33. A histogram method sorted sequential groups of FFT bins taken 2048 at a time. The top 20 (about 10%) each got one vote of confidence for their phase lag position. This was performed for all 256 sets of 2048. The phase lag which had the most confidence votes was selected for equalization. This proved inconsistent when the signal levels ended up below the noise floor for remote wireless devices at longer ranges.

Still, another approach for determining the frequency offset phase lag determination correlated the 256 complex FFT carriers for each phase with the clean complex frequency domain representation of what was originally transmitted. The phase with the largest correlation peak was selected for equalization. This too proved to be biased by large system spurs, a dominant DC term or other unwanted narrowband interferers.

Yet another approach for determining the frequency offset phase lag determination involves taking the correlation between 256 FFT carriers for each phase with the clean complex frequency domain representation and measuring a pseudo-SNR for the peak. Select the phase lag that has the largest correlation peak to average power ratio. This, to some extent, biases out any heavily weighted interferers and selects the phase lag which looks the most like that which was transmitted.

Indeed, there are no timing drift consequences in the wireless ranging system 30, as the wireless transmitter 31, wireless receiver 32, and ranging controller 33 share a common clock 36. In other embodiments, the transmit clock and receive clock (not shown) are phase locked to each other. If a common clock 36 was not used, or the transmit and receive clocks were not phase locked, timing drift would result in a progressive phase rotation, with sub-carriers closer to DC having much smaller phase rotation relative to sub-carriers closer to the Nyquist frequencies. This would distort the channel estimate in a direct relationship to the drift amount and cause static errors in the frequency estimation process described later.

Figure 6A:
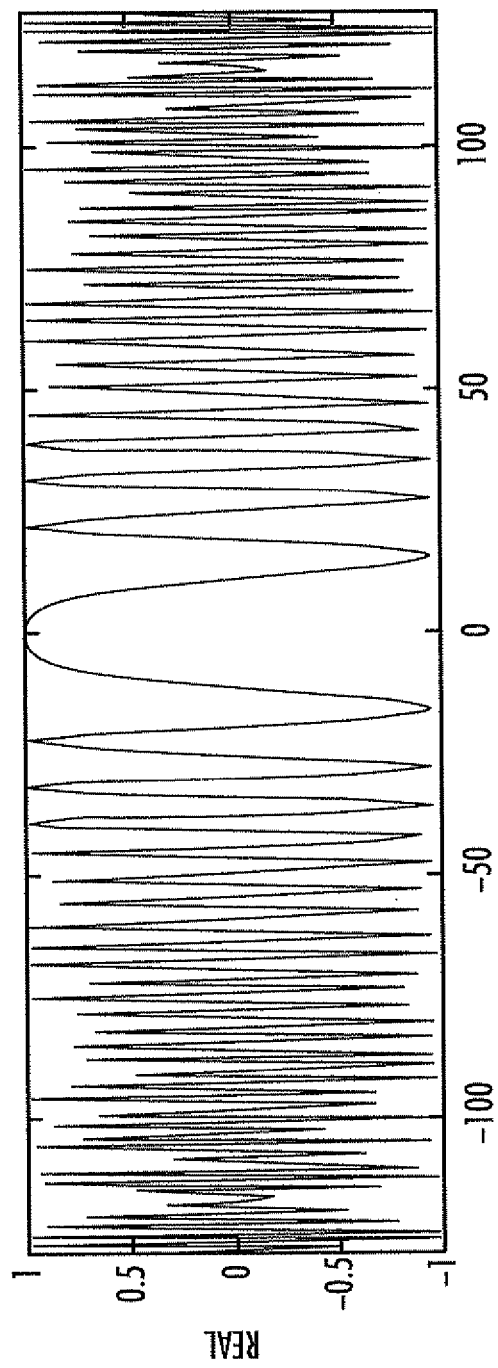
FIGS. 6a and 6b are graphs of the respective real and imaginary frequency domain representations of an inverse of the OFDM base waveform of FIG. 2.
Figure 6B:
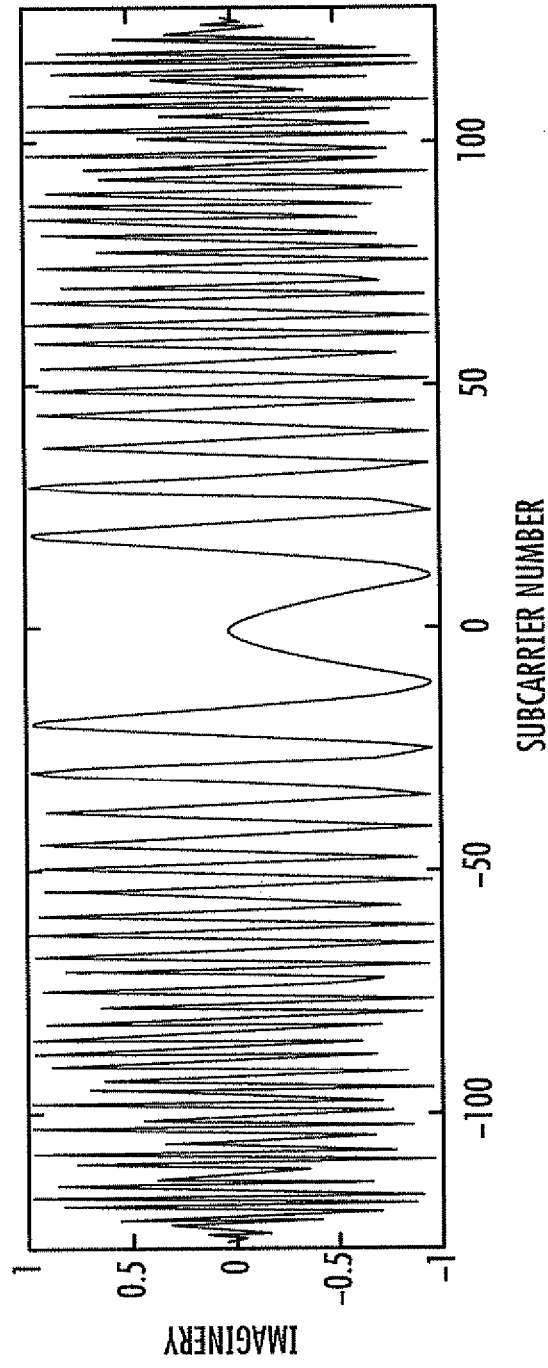

Referring now additionally to FIG. 6, the OFDM sounder waveform 41 illustratively has an invertible frequency domain representation. Given that the center sub-carrier (DC) of the frequency domain representation is zero, the inverse for that is not defined. As illustrated in FIG. 6, the terms near the center sub-carrier which are invertible are approaching $1+j*0$. Therefore, in the inverse frequency domain representation of the OFDM sounder waveform, the DC term sub-carrier is replaced with $1+j*0$. The remaining 255 inverse values are obtainable and stored in the wireless receiver 32 or ranging controller 33 for use in the channel equalization process.

Figure 7A:
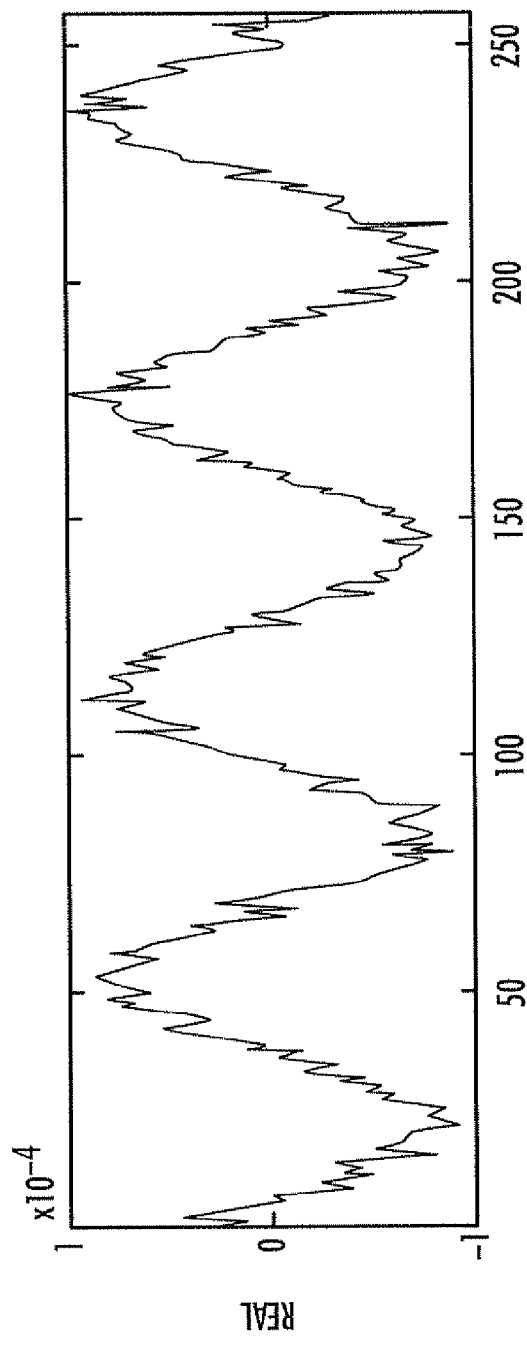
FIGS. 7a and 7b are graphs of the respective real and imaginary frequency domain representations of the received return waveform of FIG. 5 after equalization processing.
Figure 7B:
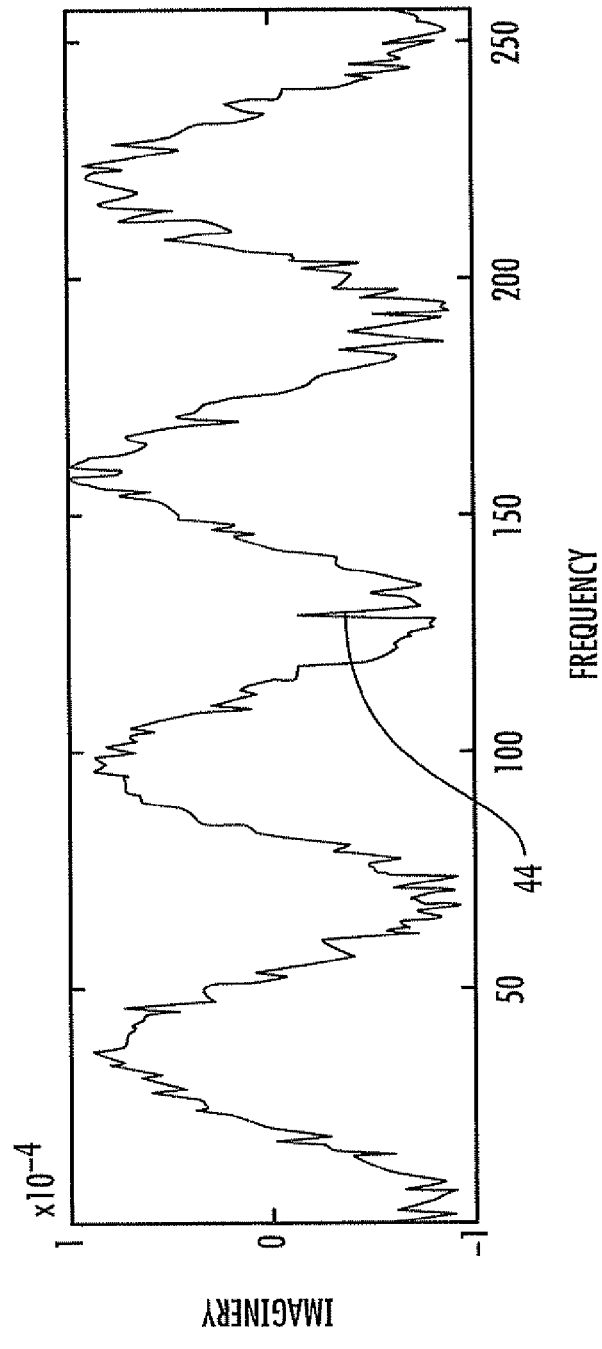

Equalization processing at the ranging controller 33 involves point-by-point multiplying of the downsampled (256) sub-carrier phase of the FFT by the inverse frequency domain representation of the OFDM sounder waveform illustrated in FIG. 6. This results in the channel estimate that includes the sinusoidal components that relate to round trip delay. An example channel equalization result is illustrated in FIG. 7.

The selected downsampled channel response plot in FIG. 5 includes a dot in the center of the spectrum that is much lower than all the rest. This is the DC sub-carrier term 44 that was not transmitted. The DC term 44 was compensated for in the inverted frequency domain reference, but as illustrated in the plot in FIG. 7, there is a value (more obvious in the imaginary plot) that appears to be incorrect in magnitude. This is the DC term 44 which, without noise would be at 0+j*0. The DC term 44 creates one sample that is not in agreement with the other 255 in the representation of the sinusoidal component related to round trip delay. To compensate for this, the DC term 44 is replaced by the average of the sub-carrier to the left and right. The bin to correct with no frequency offset is just the center bin. When there is significant frequency offset, the DC bin has been shift up or down accordingly. Therefore, the new DC bin location should be determined, as will be discussed in further detail. The plot illustrated in FIG. 8 is similar to the plot in FIG. 7, but the DC term 44 has been interpolated using its two neighbors. This can be seen more specifically at frequency bin 128 of the imaginary component plots of FIGS. 7 and 8.

Figure 10:
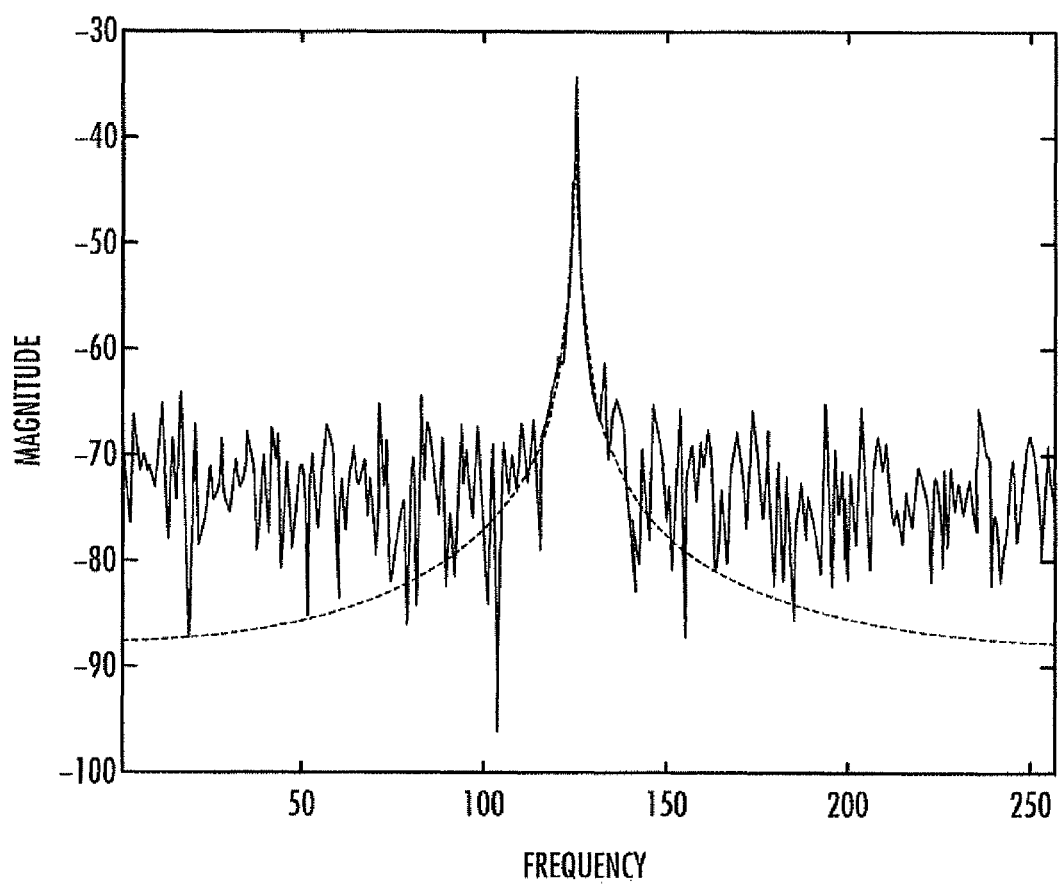
FIG. 10 is a graph FFT representation of a received return waveform after equalization and the noise reduced channel estimate of FIGS. 9a and 9b.

After the channel equalization result has been DC bin corrected, a noise reduced version is desired. For example, a signal enhancement algorithm developed by James Cadzow in *Signal Enhancement, A Composite Property Mapping Algorithm*, IEEE Trans. on Acoustics, Speech, and Signal Processing, Volume ASSP-36, No. 1, pp. 49-62, January 1988, the entire contents of which is incorporated herein by reference. The Cadzow algorithm seeks to recover a signal from noise contaminated distorted measurements made on that signal. This objective is achieved by using a set of properties which the signal is known or is hypothesized as possessing. The measured signal is modified to the smallest degree to sequentially possess each of the individual properties. Conditions for the algorithm's convergence are established in which the primary condition is that a composite property mapping be closed. This is a relatively unrestrictive condition in comparison to that of most existing signal enhancement algorithms. A characteristic that can be exploited is the bounding of the number of "significant" sinusoidal components to a range representative of the collection environment. An overlay of the noise reduced channel estimate is shown in FIGS. 9 and 10. The noise reduced channel estimate is submitted to the singular value decomposition algorithms. Of course, other noise reduction techniques may be used, as will be appreciated by those skilled in the art.

Any number of spectral estimation techniques can now be applied at the ranging controller 33 to resolve the frequencies in noise. For example, three methods based on singular value decomposition may be used. A first spectral estimation technique is the Hankel singular value decomposition (HSVD) using the method of Barkhuijsen, et al., *J. Magn. Reson.* 73, 533 (1987). A second spectral estimation technique was the Hankel total least squares (HTLS) using the method of Van Huffel, et al., *Total Least Squares Based Algorithm for Time-Domain NMR Data Fitting*, ESAT Laboratory-Katholickle Universiteit Leuven, Kardinaal Mercierlaan 94, 3001 Leuven-Heverlee, Belgium, 1993. A third spectral estimation technique is Linear Prediction Method Using Singular Value Decomposition (LPSVD) and uses the method of Kumaresan and Tufts, *Estimating the Parameters of Exponentially Damped Sinusoids and Pole-Zero Modeling in Noise*, IEEE Trans. Acoust., Speech, Signal Process., ASSP-30:833-840, 1982. All of the above-noted references that describe spectral estimation techniques are herein incorporated by reference.

Depending on the frequency resolution needed, which is directly related to range, other methods may be used. Each method has pros and cons and there may be methods that work better in lower signal to noise conditions, as will be appreciated by those skilled in the art. The spectral estimation problem has been greatly reduced by the significant data reduction process that comes from the periodic concatenation of the base waveform segments. Most spectral estimation techniques typically need to operate on the million or half million samples, while in this case, operation is on the 256 sample channel estimate.

The wireless ranging system 30 advantageously has the ability to resolve sub-sample delay resolution. Each integer frequency component corresponds to a sample of round trip delay. If the frequency is measured to be 2.87 Hz, that corresponds to 2.87 samples of round trip delay (at the original sample rate). Channel estimates are illustrated in FIGS. 11 and 12 for simulations of exactly 2.0 and 2.5 samples of round trip delay, respectively. Notice two full periods of the waveform in FIG. 11, then two and a half periods in FIG. 12, respectively. The samples of round trip delay are related at the ranging controller 33 to a distance based upon the sample rate. For example, as illustrated in Table 1 below, a 2.0 sample delay may be related to a distance at different sampling rates. Of course, other sampling rates may be used, as will be appreciated by those skilled in the art, but may be limited by the components of the wireless ranging system 30.

TABLE 1

| Sample Rate | Sample in Time | Sample in Distance |
|---|---|---|
| 1 MHz | 1000.00 nS | 299.79 meters |
| 2 MHz | 500.00 nS | 149.90 meters |
| 4 MHz | 250.00 nS | 74.95 meters |
| 8 MHz | 125.00 nS | 37.47 meters |
| 16 MHz | 62.50 nS | 18.74 meters |
| 32 MHz | 31.25 nS | 9.36 meters |

Figure 13:
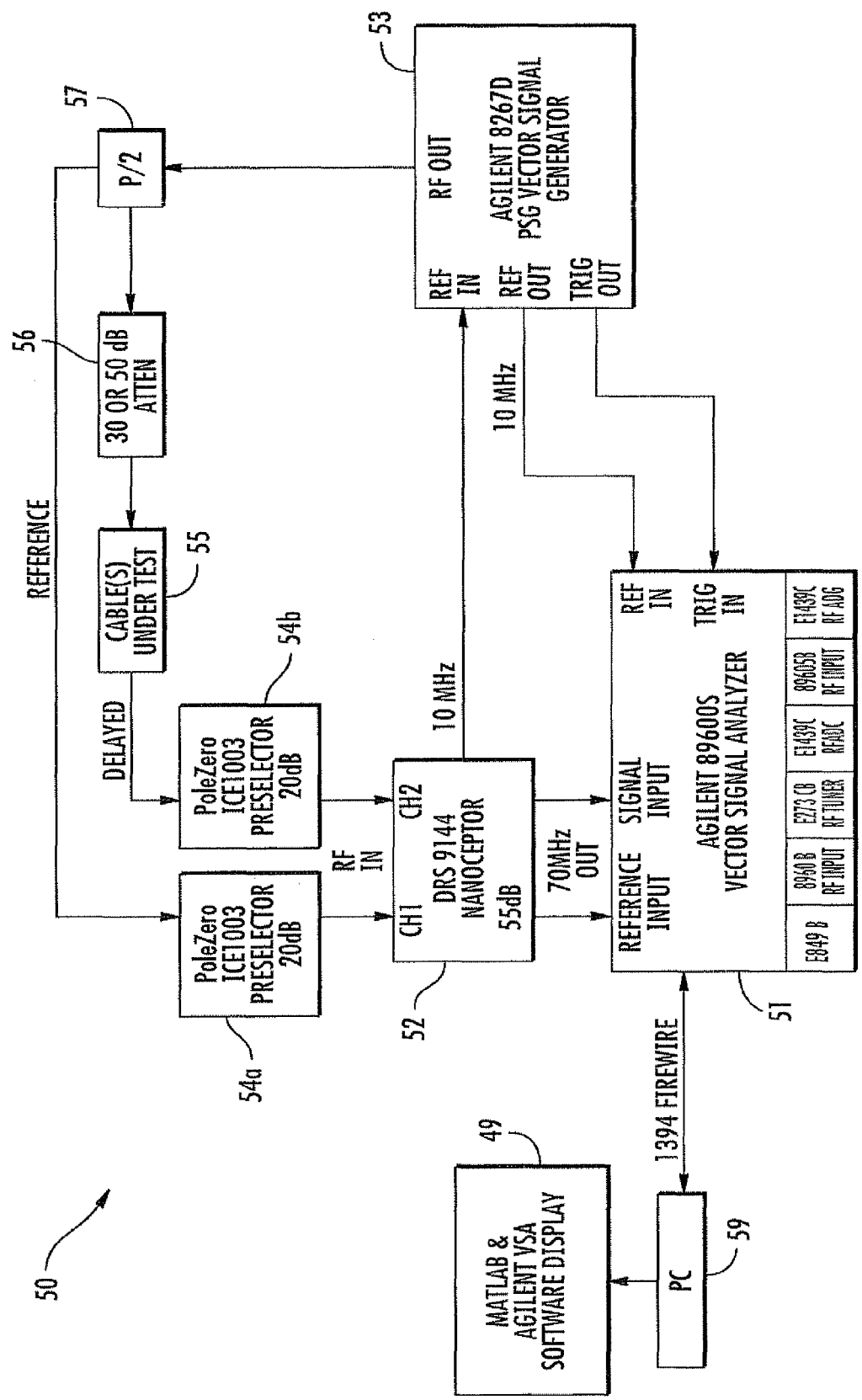
FIG. 13 is a schematic diagram of a test setup of the wireless ranging system in accordance with the present invention.
Figure 14:
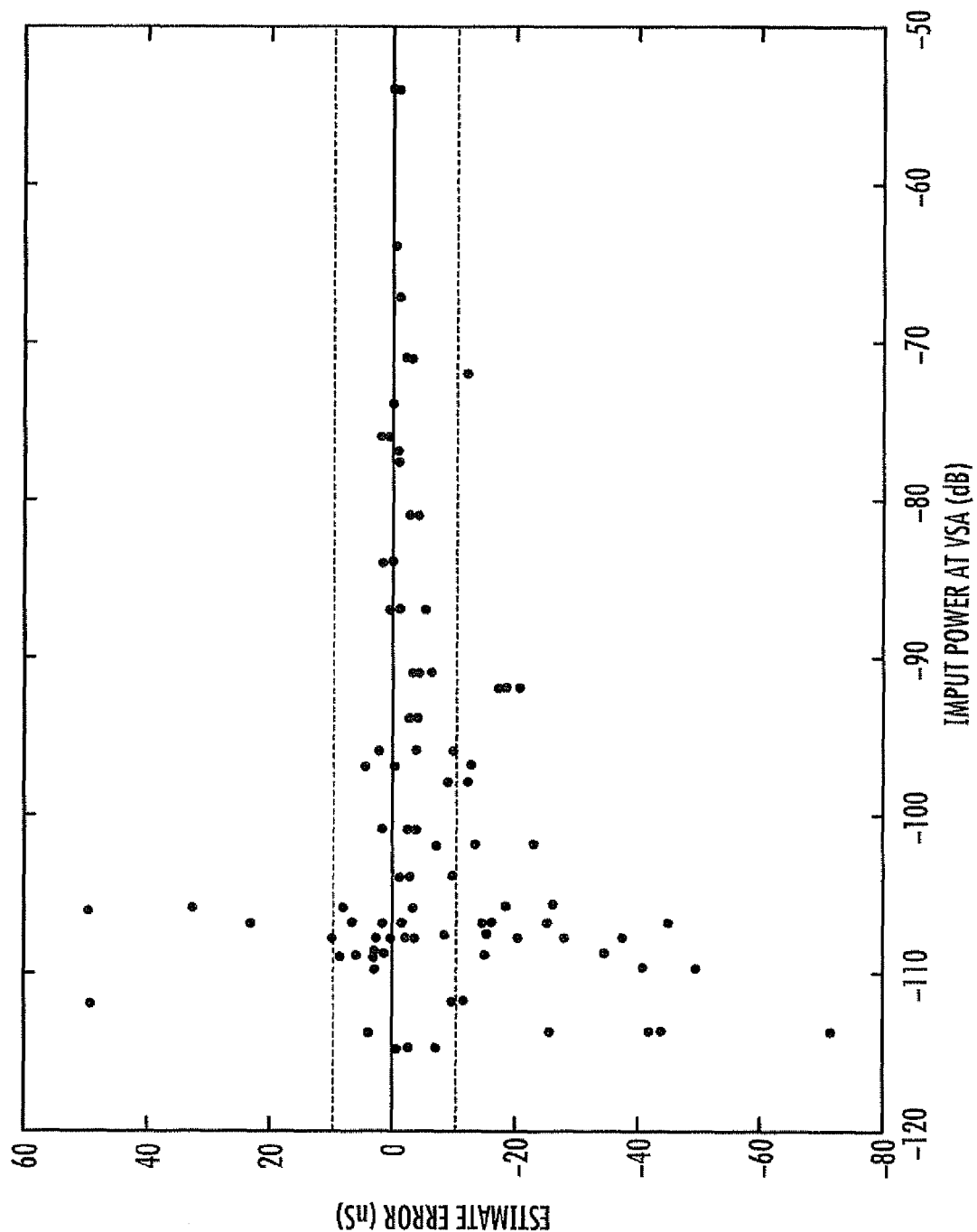
FIG. 14 is a graph of the measured ranging delay error of the cables tested in the system of FIG. 13.
Figure 15:
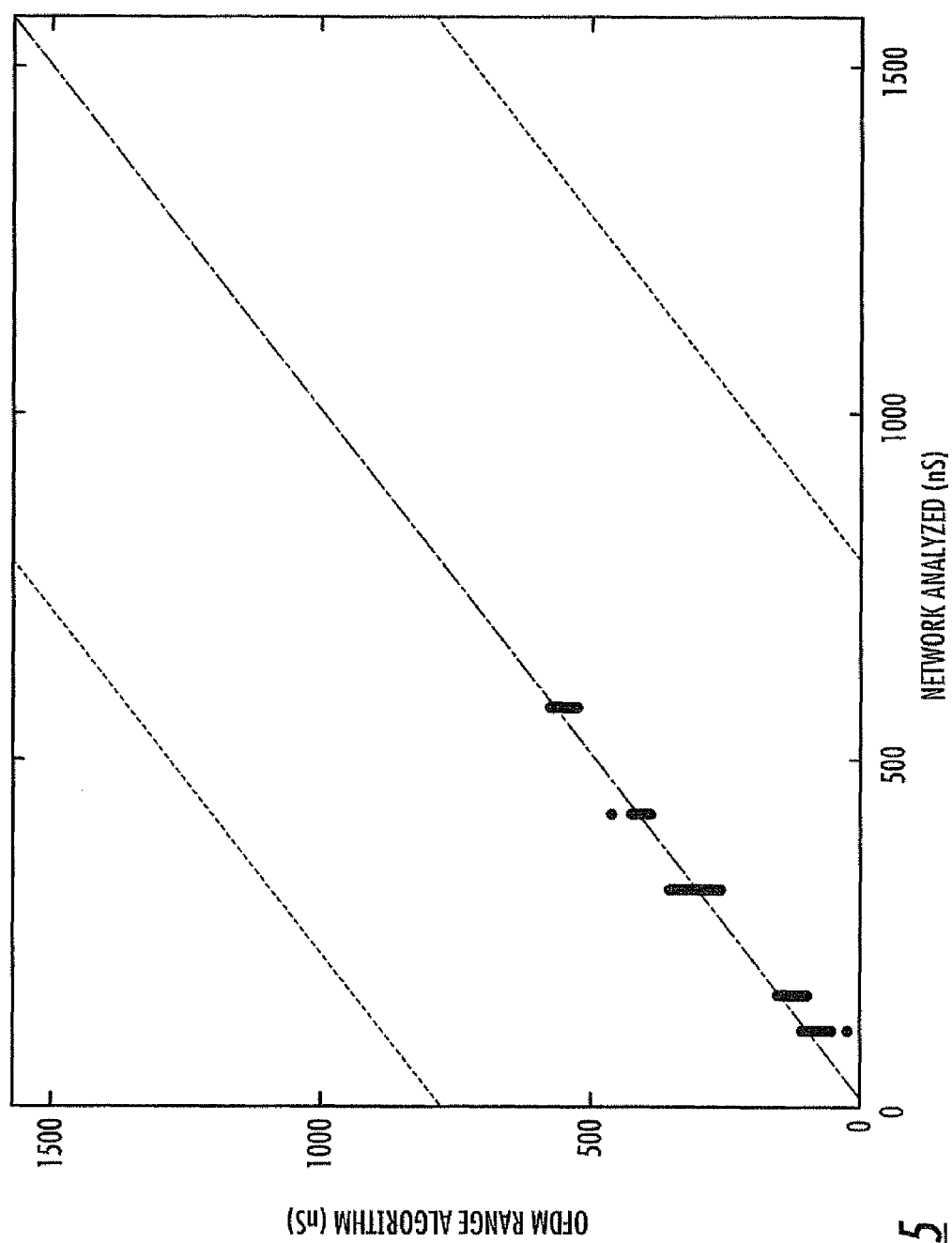
FIG. 15 is a graph of the measured versus actual results for various input ranges of the vector signal analyzer of FIG. 13.

Referring now additionally to FIGS. 13-15, the above described wireless ranging system 30 was tested and implemented using a wireless ranging system test setup 50, as illustrated in FIG. 13. As illustrated, a vector signal generator 53 generates the multi-carrier base waveform and transmits sounder waveform. A splitter 57 is coupled to the vector signal generator 53. A reference signal is output from one port of the splitter 57. An attenuator 56 is coupled to the other port of the splitter 57. Cables 55 are coupled to the attenuator 56. The cables 55 and the reference output from the splitter 57 each are coupled to respective filters 54a, 54b. Each respective filter 54a, 54b is input to the digital signal receiver 52, and passed on to the vector signal analyzer 51 for analysis. A computer 59, including related software, and a display 49 are coupled to the vector signal analyzer 51. The vector signal analyzer 51 and the computer 59 cooperate to generate the time domain samples from the return waveform, convert the time domain samples into the frequency domain data, and process the frequency domain data to determine the range of the simulated remote wireless device. The vector signal analyzer 51 and the computer 59 also cooperate to perform other functions, for example, noise reduction, and others, as noted above.

Three cables 55 were used as the cables under test, and along with the attenuator 56, which was calibrated out or had its delay removed from the system, provide the delay to simulate the remote wireless device. Cable 1 had a measured delay of 106 nS, cable 2 had a measured delay of 155 nS, and cable 3 had a measured delay of 309 nS. To create longer delay profiles, all pairs of two cables (261 nS, 415 nS, and 464 nS), and all three cable lengths combined (570 nS) were examined. Given the expected ranging delay through the seven cable length possibilities, each sample is plotted and shown in the graph in FIG. 14. The x-axis is input power at the vector signal analyzer 51 and the y-axis is each test collection with the expected value subtracted to show error. The measured versus actual results for various input ranges are illustrated in FIG. 15. The dashed line represents one sample delay at 1.28 MHz or about 781 nS.

It should be noted that the DRS-9144 Nanocepter or the digital signal receiver 52 can generally only tune to frequencies ±100 kHz. Given that some of the actual transmit frequencies may be spaced by as little at 5 kHz or 12.5 kHz, thus the return frequencies spaced by twice that, it is important to recognize the consequences to inexact frequency tuning. The current implementation design has a digital down converter in a field programmable gate array (FPGA) after the analog to digital converter. This is expected to complete the remaining tuning resolution not available in the DRS-9144 digital signal receiver 52.

When the received OFDM sounder waveform has a frequency offset, an amount that depends on the number of concatenated copies and the FFT resolution per bin is acceptable, before other corrections are to be made. The FFT downsample phase can be any one of the number of copies of the base waveform segment transmitted. Each increase in sample phase corresponds to a frequency offset related to the hertz/bin of the FFT. For the existing example, each FFT bin resolved 2.44 Hz. As long as the overall frequency offset is less than the number of waveform copies times this frequency resolution (2048*2.44=5000 Hz), the number of sinusoids estimated in the channel estimation should be correct.

Once this frequency estimation exceeds that offset threshold, the number of sinusoids estimated should be more or less than expected. The amount generally depends on how many times the maximum resolvable offset is "wrapped" around (5 kHz in this example). If the frequency is higher, the range estimate is shorter than expected and if the frequency is lower, the range estimate is longer than expected. So, in this example, an uncompensated +12 kHz frequency offset should have its range estimate compensated two samples higher. This sort of processing is typically not needed in the final implementation, but is worth noting, as it was needed for preliminary lab testing because the digital down converter (DDC) was not available early in the integration cycle. The measured versus actual results for various input ranges are illustrated in FIG. 15. The dashed line represents one sample delay at 1.28 MHz or about 781 nS.

Figure 16:
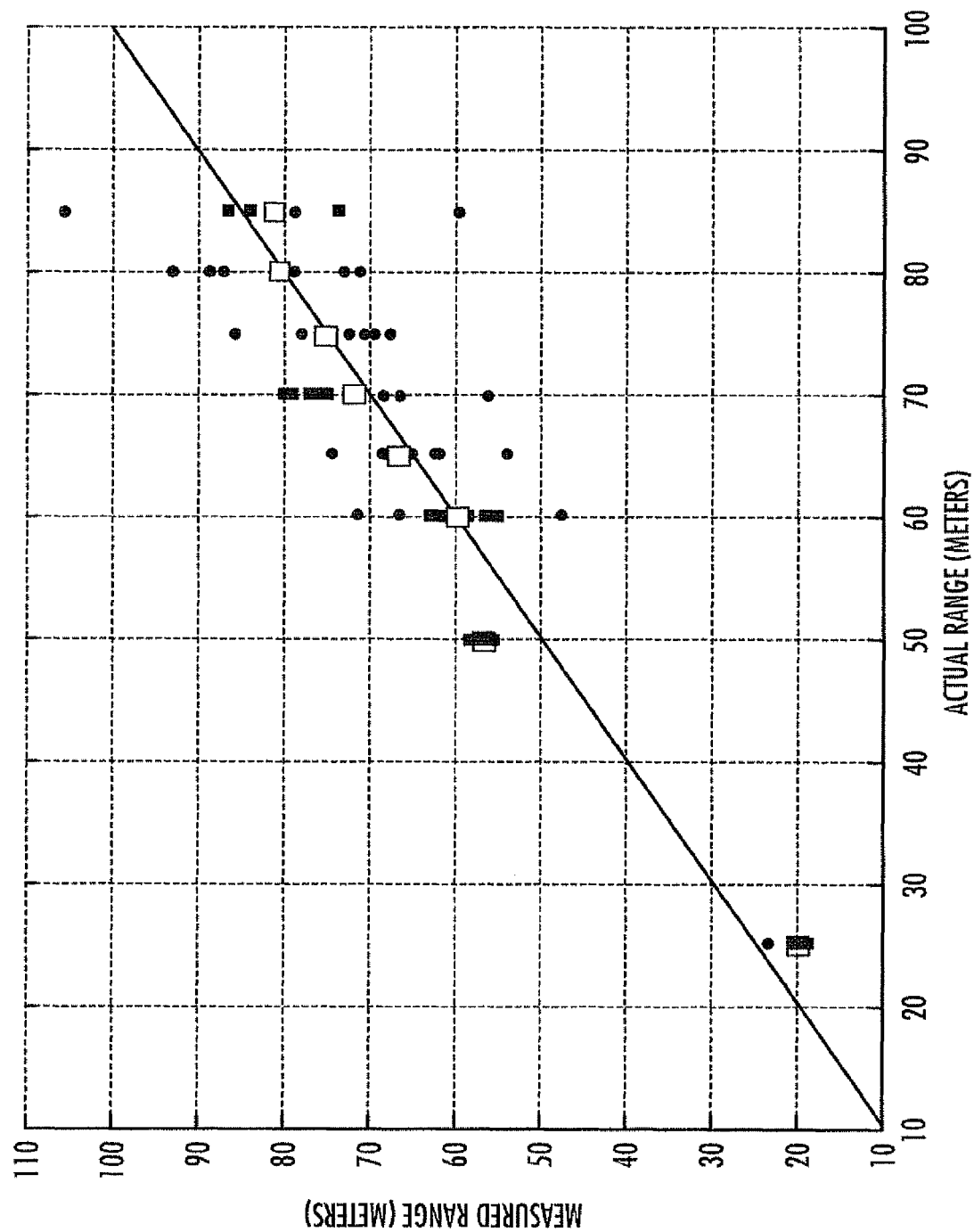
FIG. 16 is a graph of range accuracy for a remote wireless device using the wireless ranging system of FIG. 2.
Figure 17:
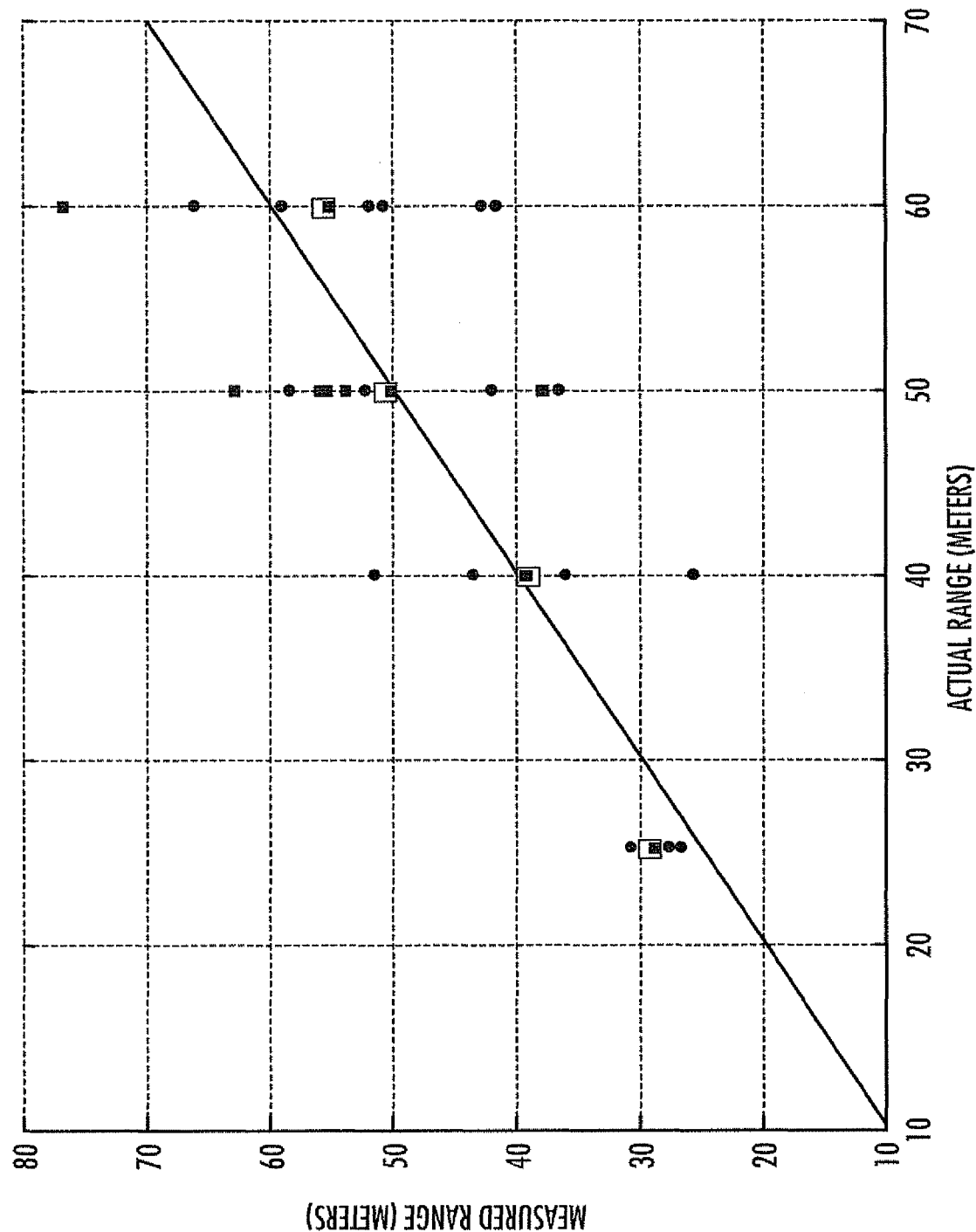
FIG. 17 is a graph of range accuracy for another remote wireless device using the wireless ranging system of FIG. 2.
Figure 18:
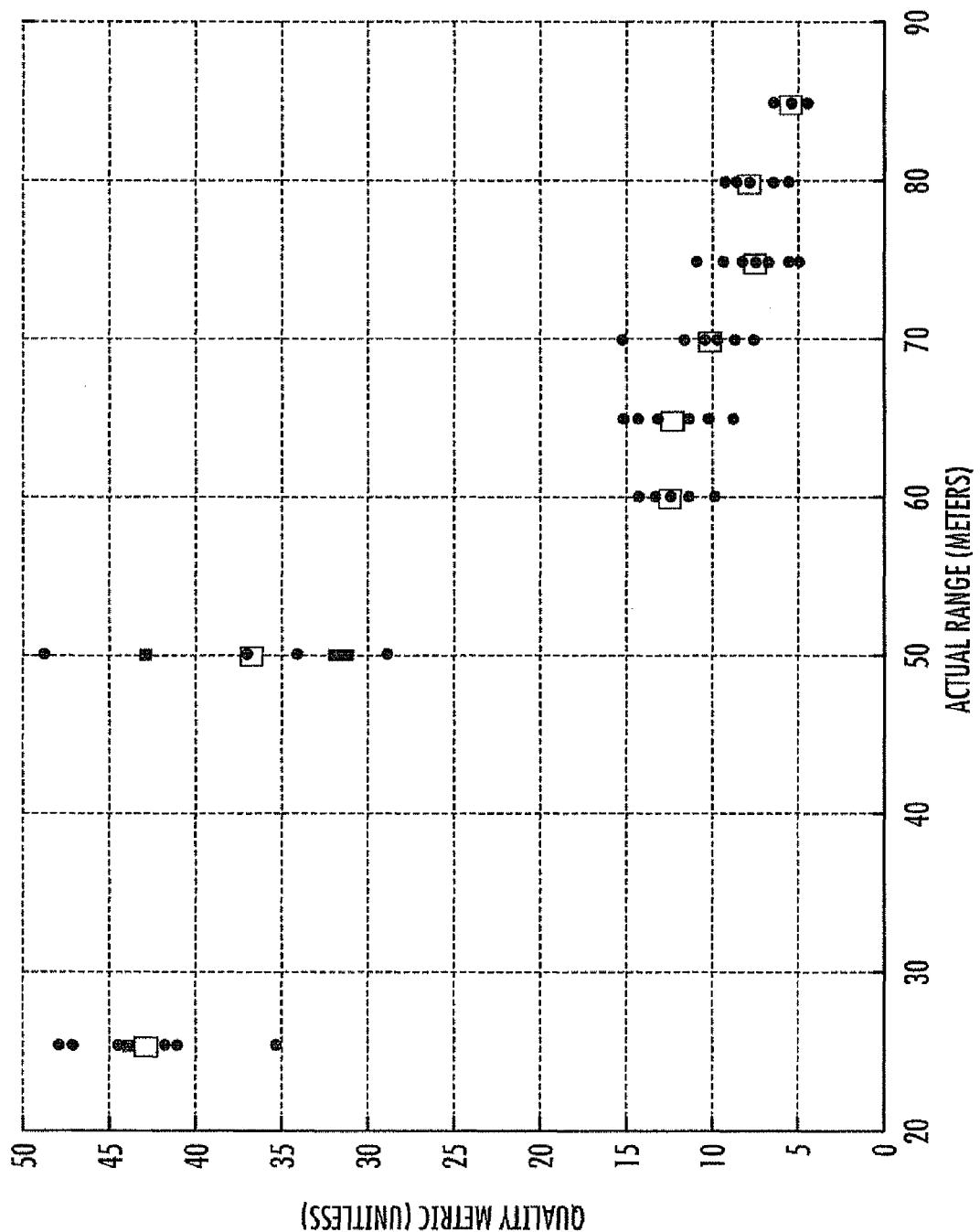
FIG. 18 is a quality metric graph for a remote wireless device using the wireless ranging system of FIG. 2.
Figure 19:
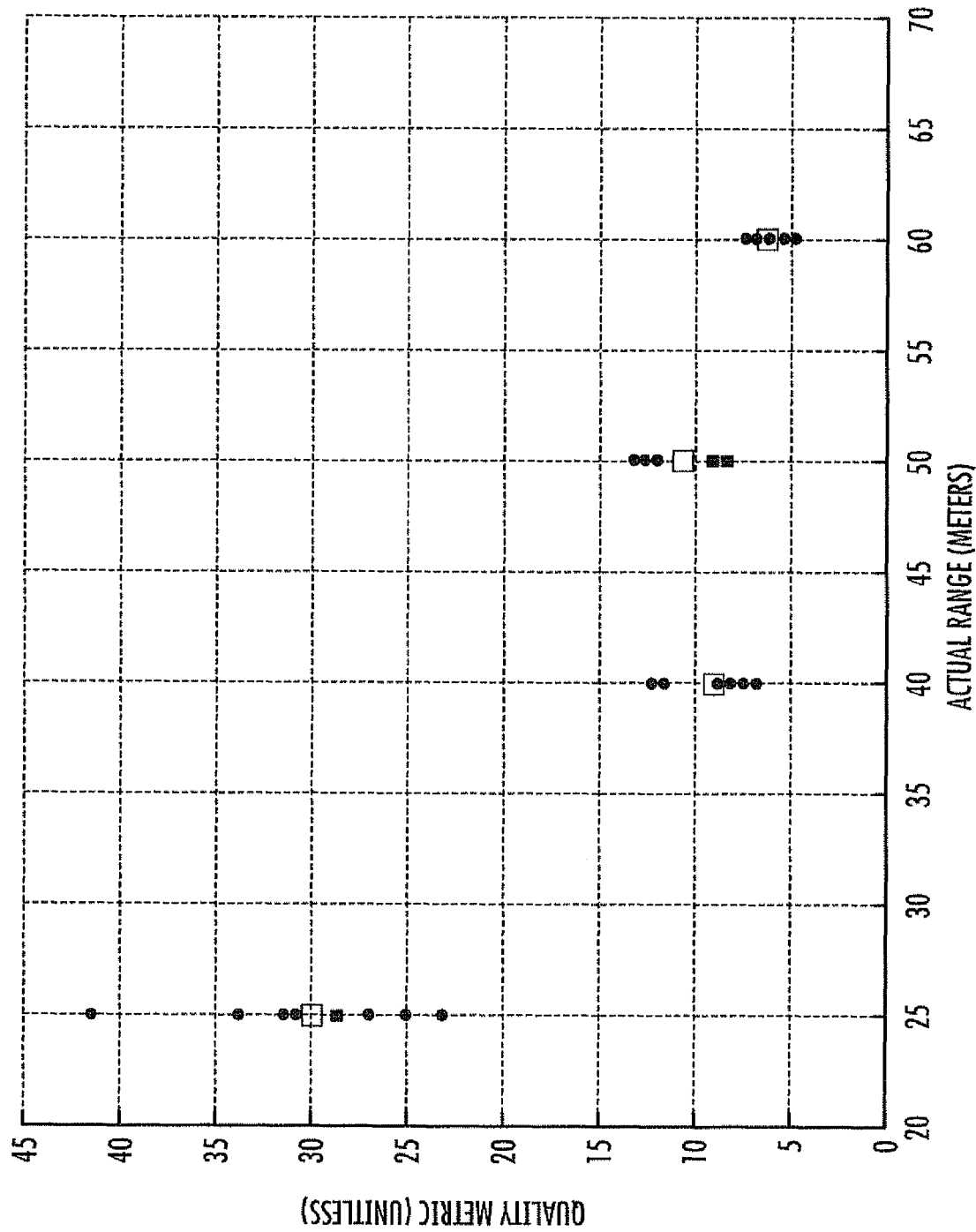
FIG. 19 is a quality metric graph for another remote wireless device using the wireless ranging system of FIG. 2.
Figure 20:
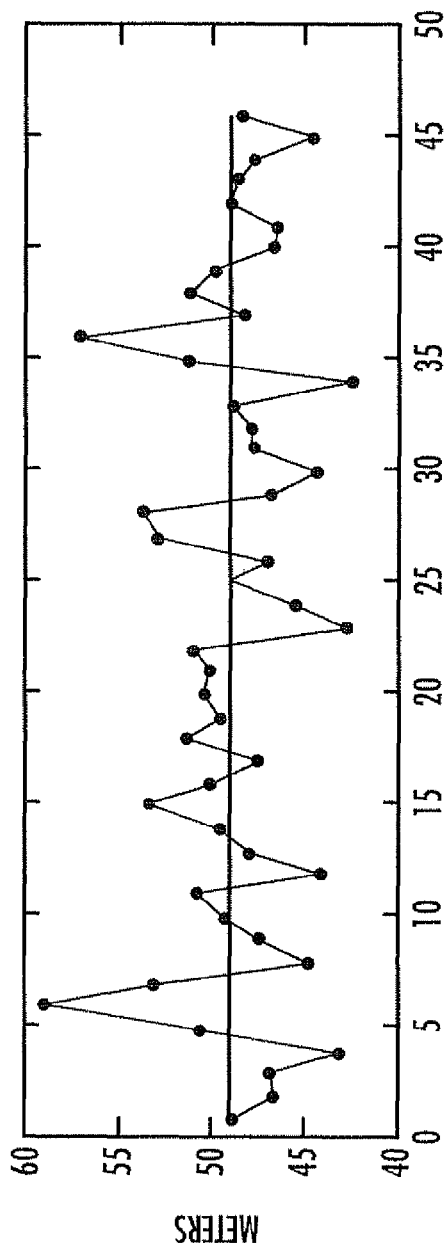
FIG. 20 is a range precision graph for a remote wireless device using the wireless ranging system of FIG. 2.
Figure 21:
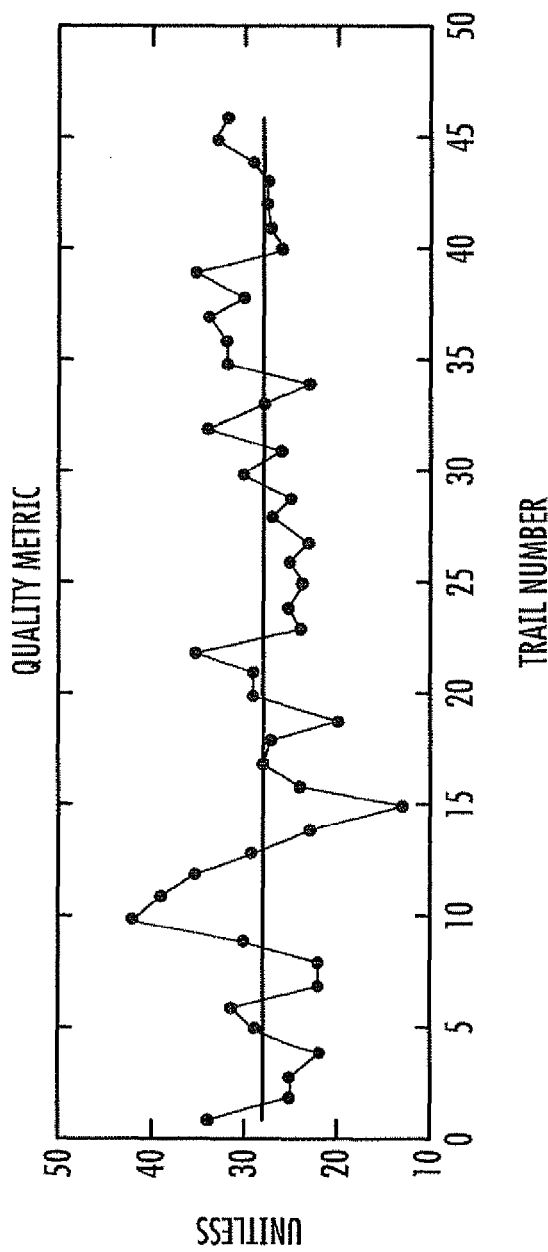
FIG. 21 is a quality metric graph corresponding to the range precision graph of FIG. 20.
Figure 22:
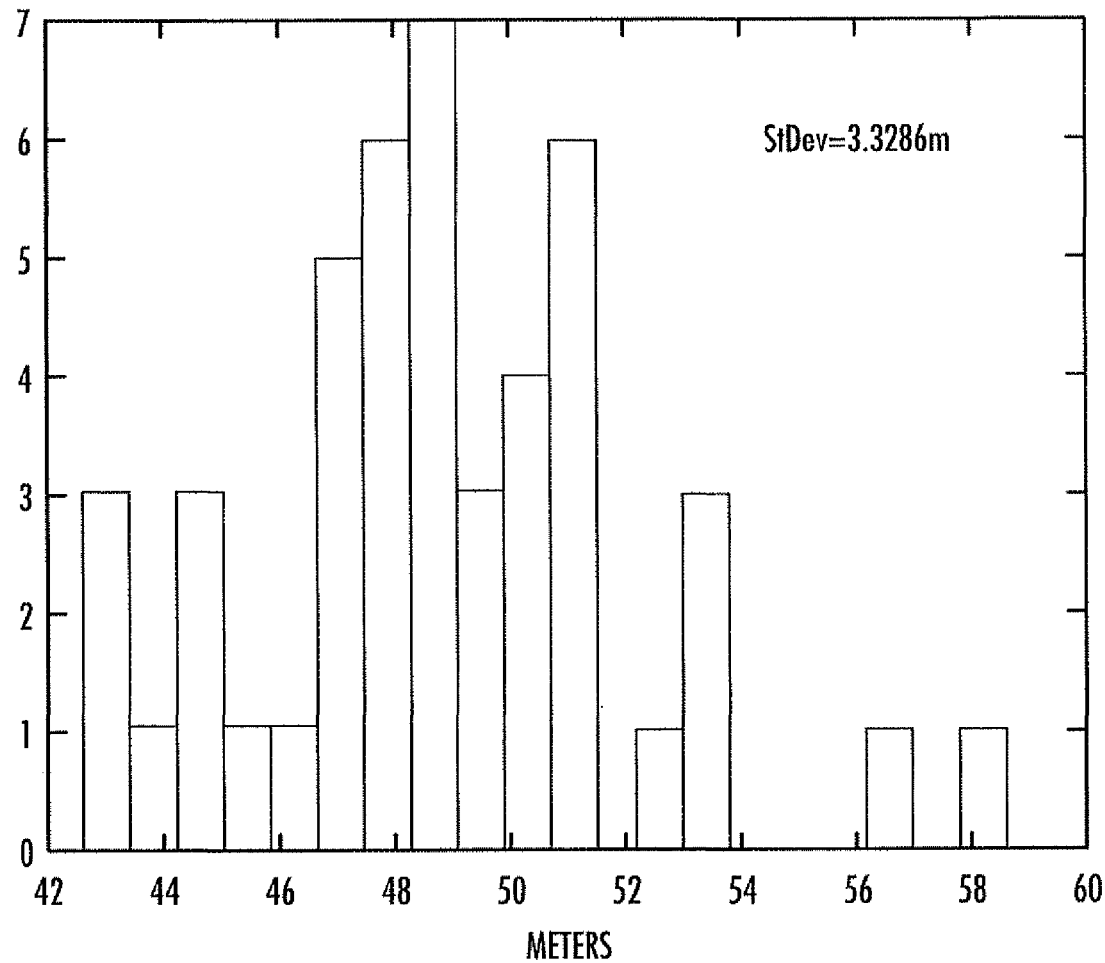
FIG. 22 is a range precision histogram corresponding to the range precision graph of FIG. 20.

Now referring to FIGS. 16-29, the wireless ranging system 30 was field tested. FIGS. 16 and 17 are graphs of range accuracy for a remote wireless device at a sampling frequency of 2 MHz. Ten trials were attempted at each range with each trial represented by a dot and the range average represented by a square box. FIGS. 18 and 19 are quality metrics for the same remote wireless device at a sampling frequency of 2 MHz. FIGS. 20 and 21 are a range precision graph and a quality metric graph for the remote wireless device at 50 meters with a 2 MHz sampling rate. FIG. 22 is the corresponding range precision histogram using the data shown in FIG. 20.

Figure 23:
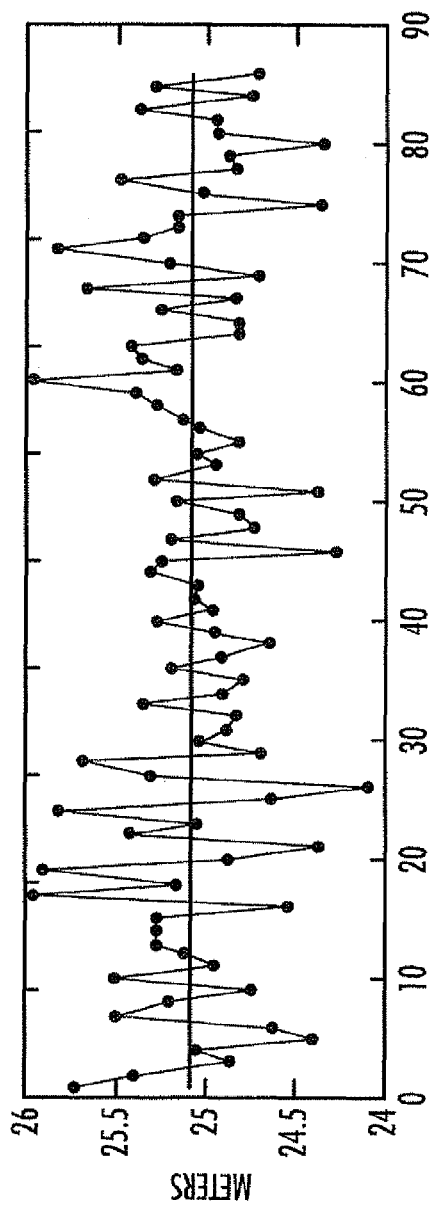
FIG. 23 is a range precision graph for another remote wireless device using the wireless ranging system of FIG. 2.
Figure 24:
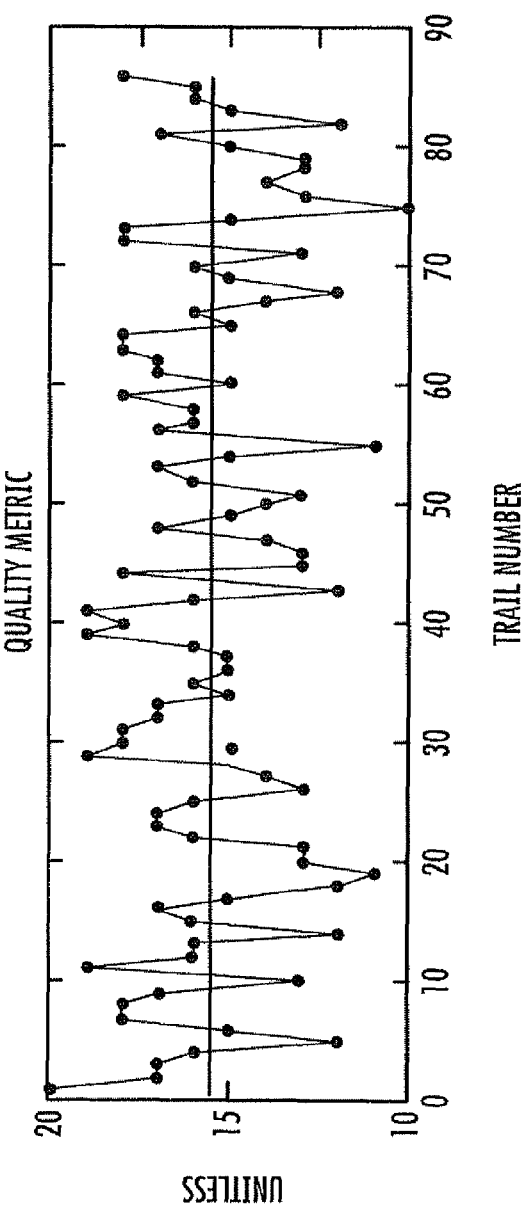
FIG. 24 is a quality metric graph corresponding to the range precision graph of FIG. 23.
Figure 25:
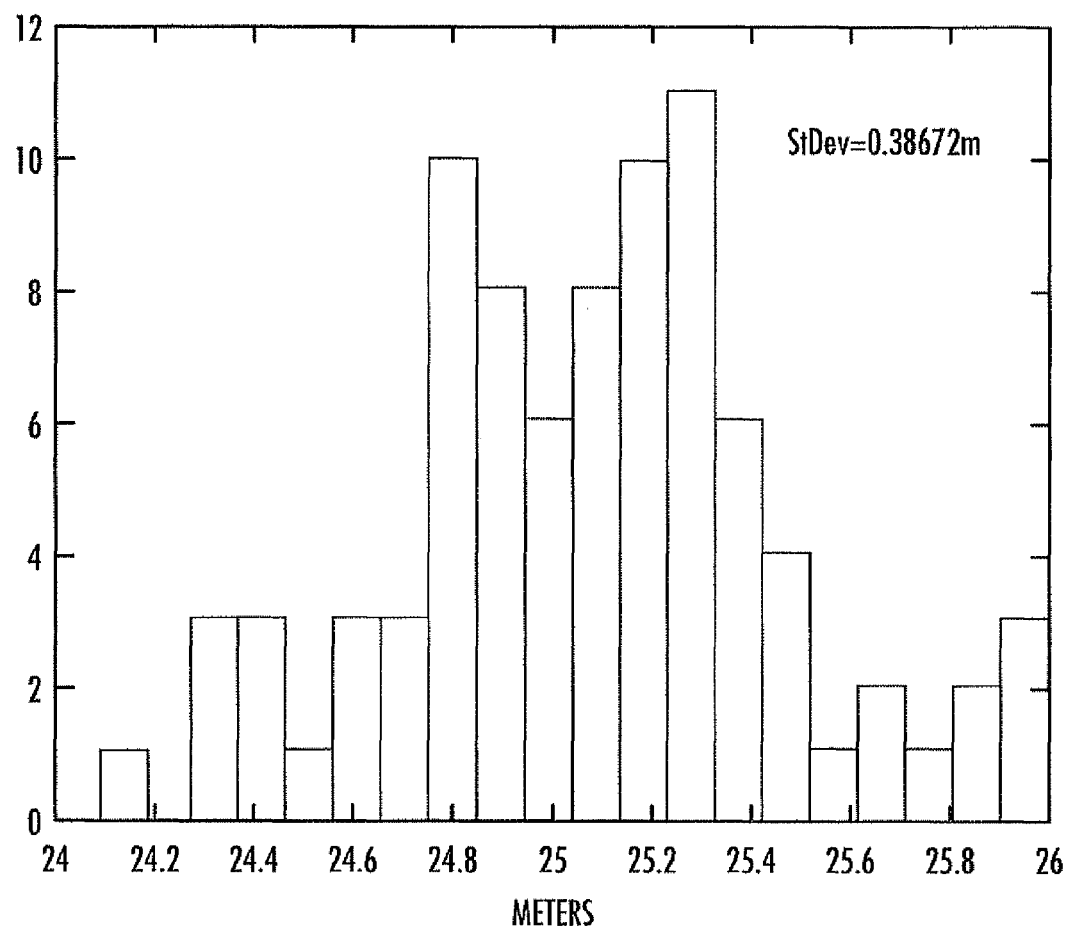
FIG. 25 is a range precision histogram corresponding to the range precision graph of FIG. 23.

FIGS. 23 and 24 are a range precision graph and a quality metric graph for a different remote wireless device at 25 meters with a 32 MHz sampling rate. The different remote wireless device has different responsive properties, for example, as will be appreciated by those skilled in the art. FIG. 25 is a corresponding range precision histogram using the data shown in FIG. 23.

Figure 26:
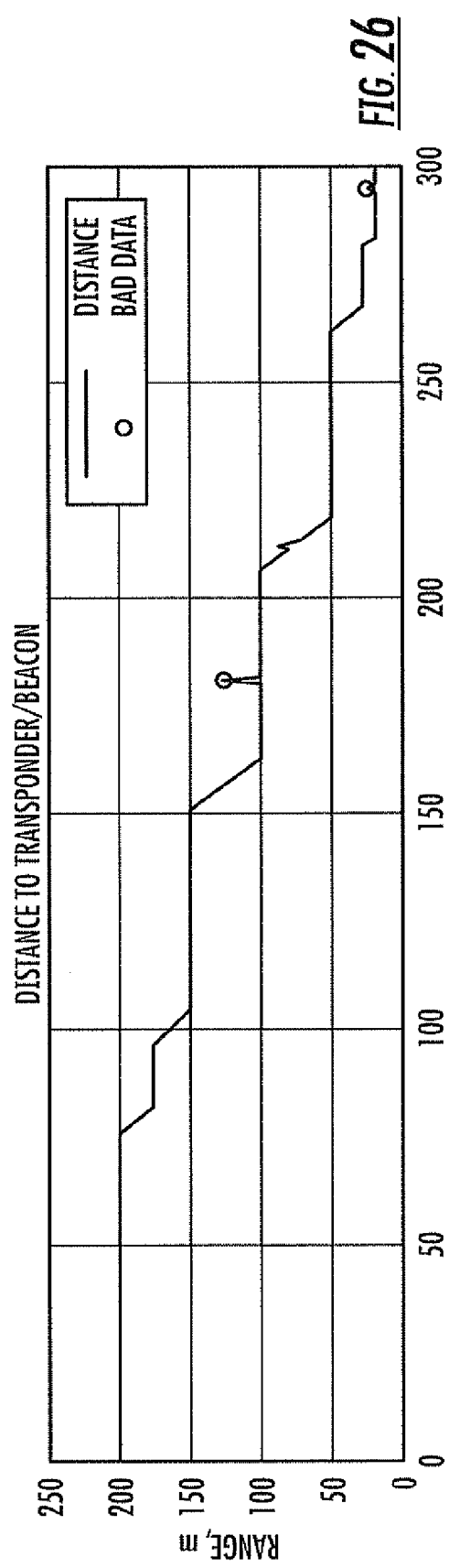
FIG. 26 is a range graph for yet another remote wireless device using the wireless ranging system of FIG. 2.
Figure 27:
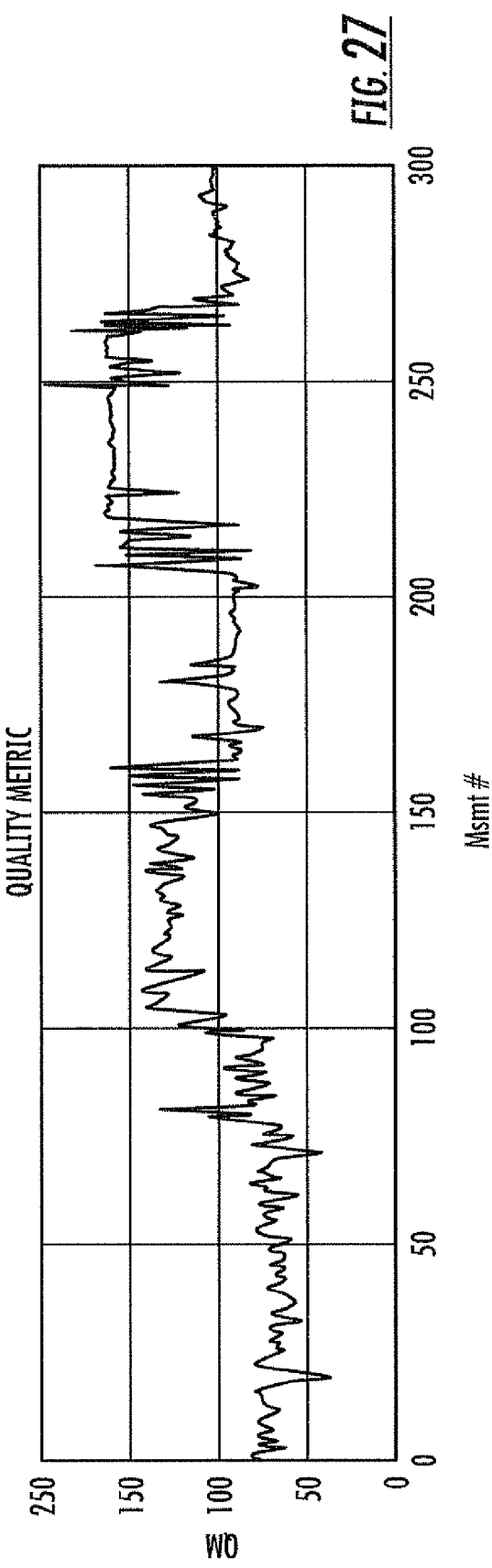
FIG. 27 is a quality metric graph corresponding to the range graph of FIG. 26.
Figure 28:
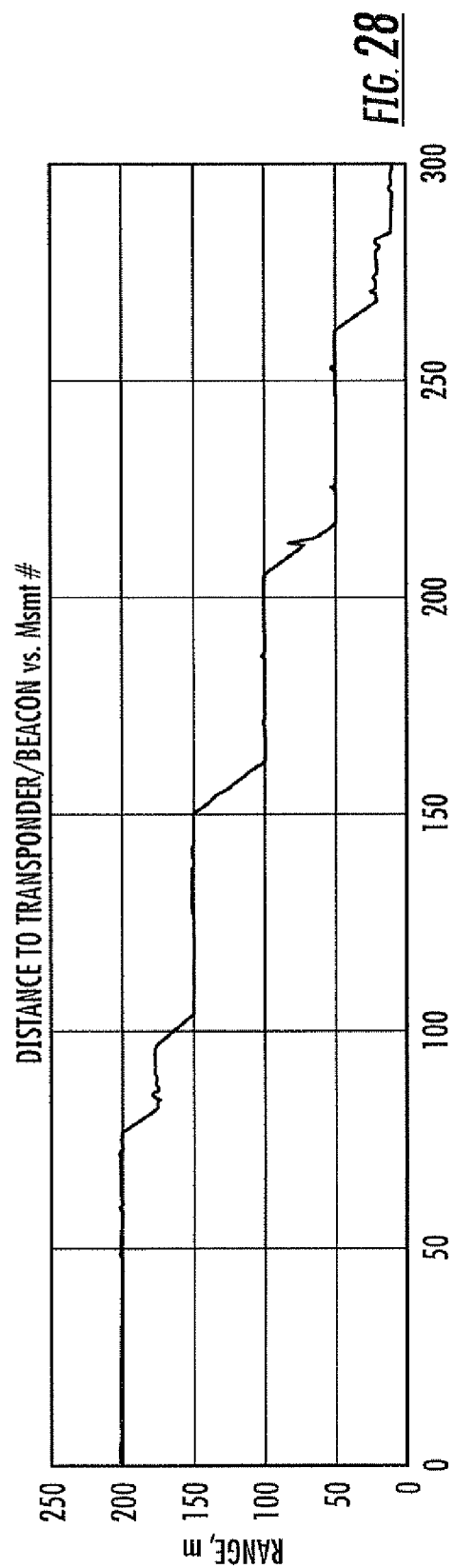
FIG. 28 is another range graph corresponding to the range graph of FIG. 26 with bad data points removed.
Figure 29:
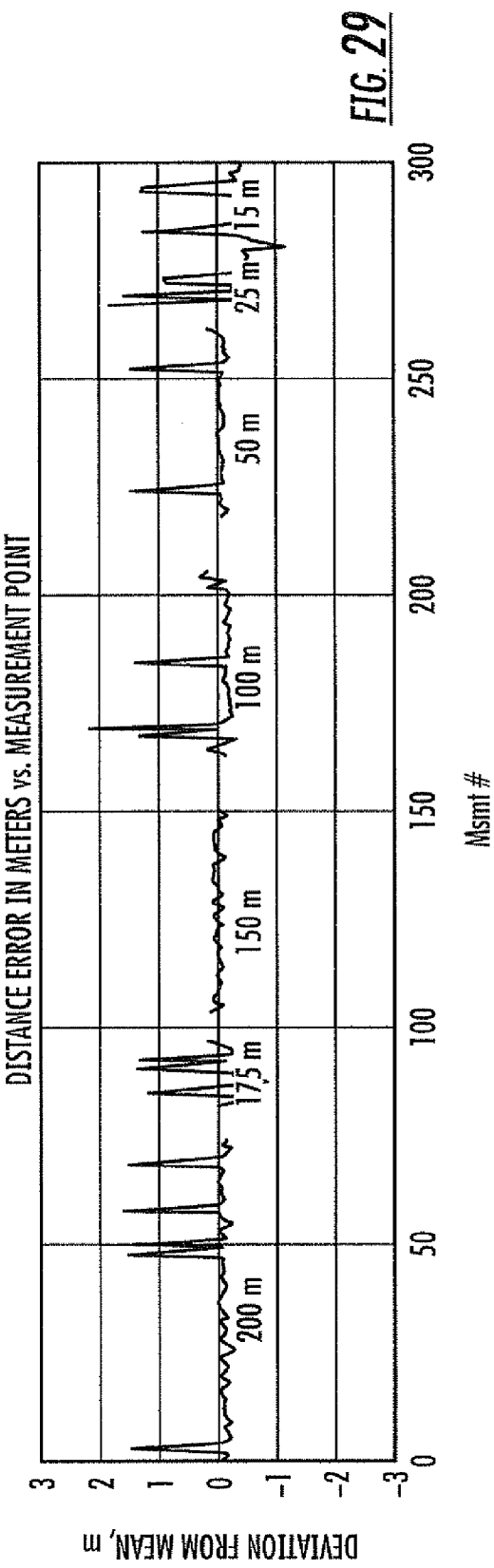
FIG. 29 is a distance error graph corresponding to the range graph of FIG. 28.

FIG. 26 is a graph of raw measurement data plotted as a distance to yet another remote wireless device is reduced from 200 meters to 15 meters. FIG. 27 is a corresponding quality metric plotted as a distance to the remote wireless device is reduced from 200 meters to 15 meters. Bad data points that are possibly caused by interference are removed from the data before the statistics are computed, as illustrated in FIG. 28. FIG. 29 is a corresponding measurement error over range graph of FIG. 28. A distance error from a mean is computed for each dwell period. Data acquired during movements of the remote wireless device is not considered for statistical calculations.

Figure 30:
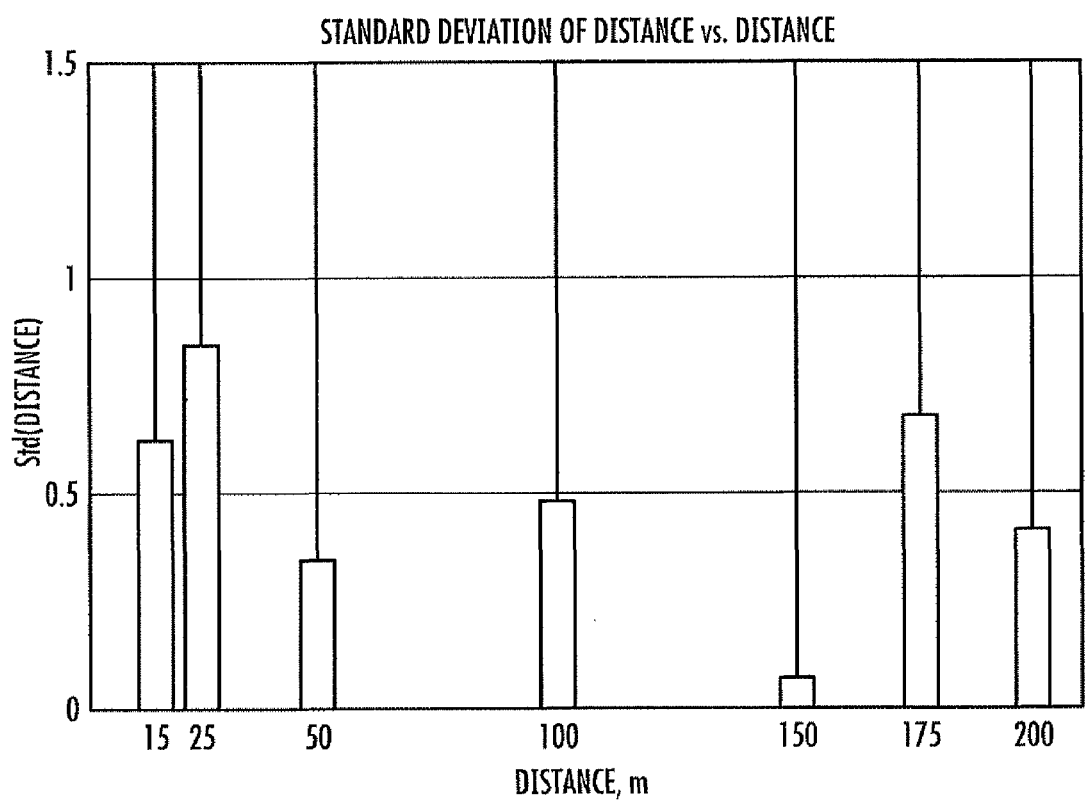
FIG. 30 is standard deviation graph corresponding to the range graph of FIG. 28.
Figure 31:
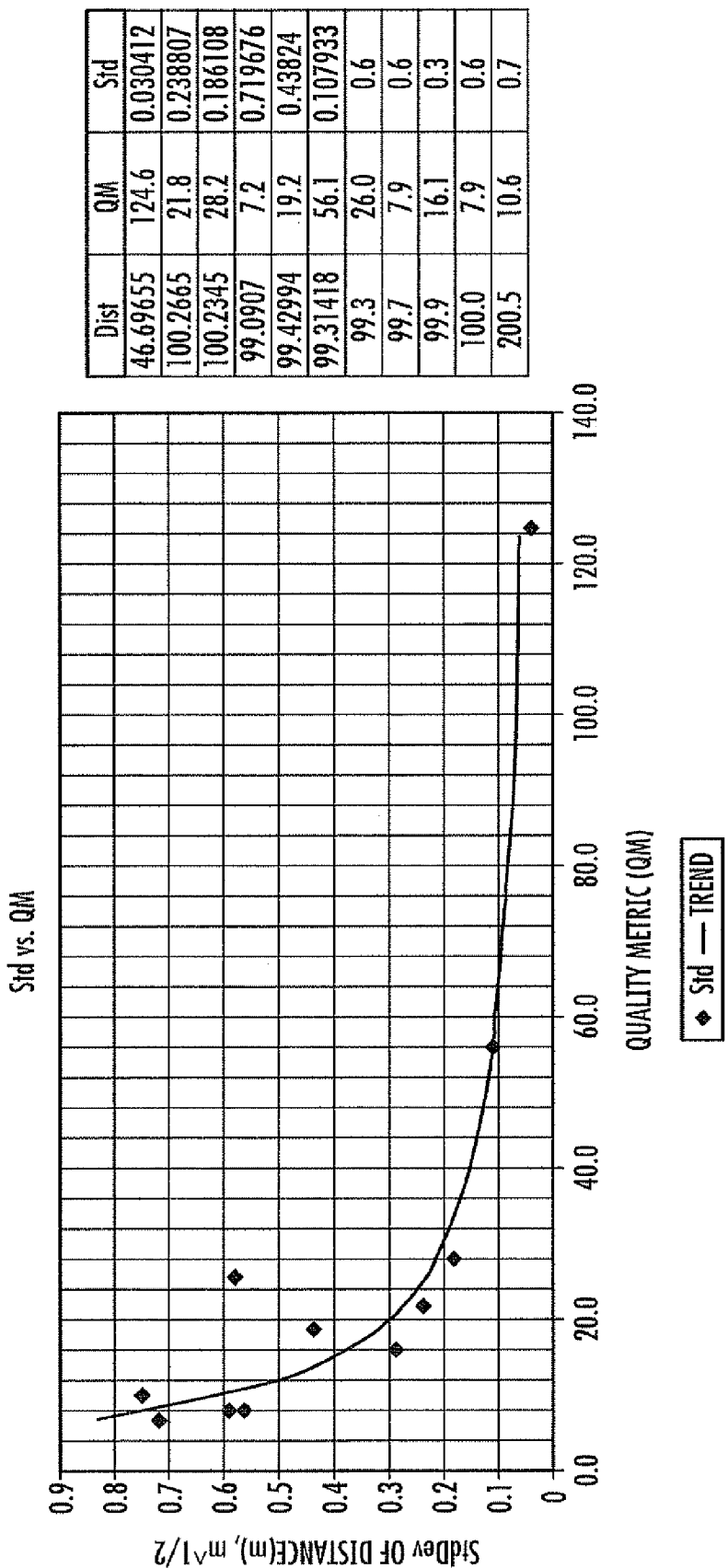
FIG. 31 is a standard deviation versus quality metric graph corresponding to the graph of FIG. 28.

FIG. 30 is a standard deviation of distance versus distance graph for the cooperating remote wireless device. The standard deviation is computed at each dwell and plotted versus distance. Note that there are no significant variations in deviation as the distance is varied. FIG. 31 is a standard deviation versus quality metric. The quality metric appears to be a reasonable predictor of standard deviation.

Figure 32:
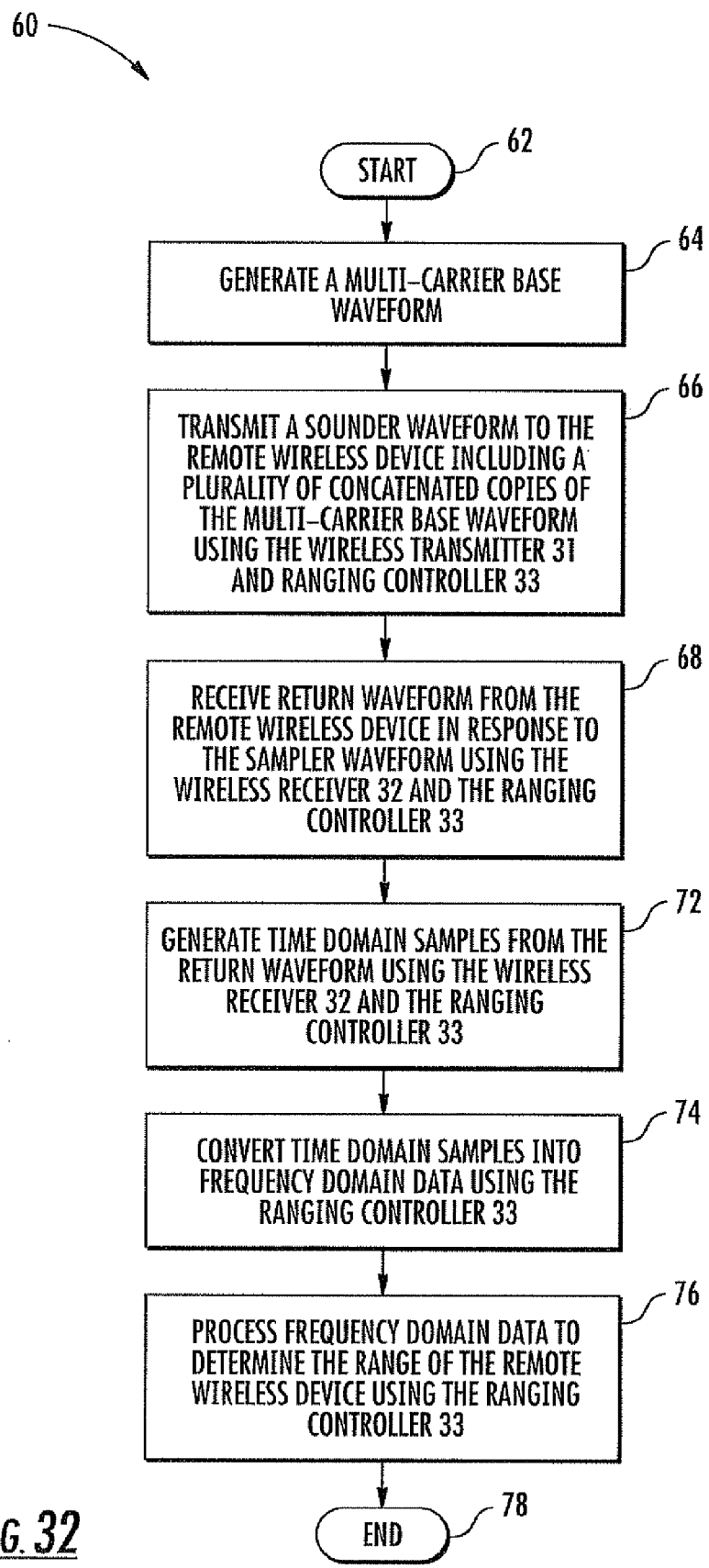
FIG. 32 is a flow chart illustrating a method for determining a range of a remote wireless device in accordance with the present invention.

Referring now to the flowchart 60 in FIG. 32, a method aspect for determining a range of a remote wireless device is now described. The wireless ranging system 30 includes a wireless transmitter 31, a wireless receiver 32, and a range controller 33 to cooperate with the wireless transmitter and wireless receiver. Beginning at Block 62, the method includes, at Block 64, generating a multi-carrier base waveform. At Block 66, the method includes transmitting a sounder waveform to the remote wireless device 34 including a plurality of concatenated copies of the multi-carrier base waveform using the wireless transmitter and the ranging controller. The method includes receiving a return waveform from the remote wireless device 34 in response to the sounder waveform at Block 68. The method further includes generating time domain samples from the return waveform at Block 72 using the wireless receiver and the ranging controller. The method further includes converting the time domain samples into frequency domain data at Block 74, and processing the frequency domain data to determine the range of the remote wireless device using the ranging controller at Block 76 before ending at Block 78.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless ranging system for determining a range of a remote wireless device, the wireless ranging system comprising:
   a wireless transmitter;
   a wireless receiver; and
   a ranging controller configured to cooperate with said wireless transmitter and wireless receiver to
      generate a multi-carrier orthogonal frequency division multiplexed (OFDM) base waveform,
      transmit a sounder waveform to the remote wireless device comprising a plurality of concatenated copies of the multi-carrier OFDM base waveform,
      receive a return waveform from the remote wireless device in response to the sounder waveform,
      generate time domain samples from the return waveform,
      convert the time domain samples into frequency domain data, and
      process the frequency domain data to determine the range of the remote wireless device by at least determining a channel estimate of the return waveform.

2. The wireless ranging system according to claim 1 wherein said ranging controller generates the time domain samples at a time domain sample rate and processes the frequency domain data to obtain a higher range resolution than obtainable based upon the time domain sample rate.

3. The wireless ranging system according to claim 1 further comprising a common clock operatively coupled to both said wireless transmitter and said wireless receiver.

4. The wireless ranging system according to claim 1 wherein said controller determines the channel estimate based upon an inversion of the transmitted sounder waveform.

5. The wireless ranging system according to claim 1 wherein said controller is configured to process the frequency domain data by at least resolving frequencies in the channel estimate.

6. The wireless ranging system according to claim 5 wherein said controller is configured to process the frequency domain data by at least reducing noise in the channel estimate.

\* \* \* \* \*